(12) United States Patent
Launders

(10) Patent No.: US 12,539,500 B2
(45) Date of Patent: Feb. 3, 2026

(54) ADDITIVE CONTAINERS

(71) Applicant: SharkNinja Operating LLC, Needham, MA (US)

(72) Inventor: Thomas James Launders, London (GB)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/899,886

(22) Filed: Aug. 31, 2022

(65) Prior Publication Data

US 2024/0066483 A1  Feb. 29, 2024

(51) Int. Cl.
| | | |
|---|---|---|
| B01F 35/43 | (2022.01) | |
| A23L 2/54 | (2006.01) | |
| B01F 23/236 | (2022.01) | |
| B01F 35/71 | (2022.01) | |
| B01F 101/14 | (2022.01) | |

(52) U.S. Cl.
CPC ............. B01F 35/43 (2022.01); A23L 2/54 (2013.01); B01F 23/2362 (2022.01); B01F 35/7176 (2022.01); *B01F 2101/14* (2022.01)

(58) Field of Classification Search
CPC .. B01F 35/43; B01F 23/2362; B01F 35/7176; B01F 2101/14; A23L 2/54
See application file for complete search history.

(56) References Cited

U.S. PATENT DOCUMENTS

| | | |
|---|---|---|
| 236,478 A | 1/1881 | Ball et al. |
| 494,483 A | 3/1893 | Malmstrom |
| 916,654 A | 3/1909 | Barwis |
| 1,242,493 A | 10/1917 | Stringham |
| 1,420,773 A | 6/1922 | Stainbrook |
| 2,400,955 A | 5/1946 | Leo |
| 2,402,132 A | 6/1946 | Goldberg |
| 2,548,241 A * | 4/1951 | Reynolds ............... G07F 13/10 194/242 |

(Continued)

FOREIGN PATENT DOCUMENTS

| | | |
|---|---|---|
| AU | 2014241782 A1 | 9/2015 |
| AU | 2012293327 C1 | 3/2016 |

(Continued)

OTHER PUBLICATIONS

International Search Report and Written Opinion received for PCT Patent Application No. PCT/US2024/016898, mailed on Oct. 11, 2024, 19 pages.

(Continued)

*Primary Examiner* — Stephen Hobson
(74) *Attorney, Agent, or Firm* — Mintz, Levin, Cohn, Ferris, Glovsky and Popeo, P.C.

(57) ABSTRACT

A dispenser for preparing beverages are provided. In one embodiment, the dispensing system includes a housing, a carbonation assembly disposed within the housing, and a drawer slidably mounted to the housing. The carbonation assembly is configured to selectively carbonate a fluid. The drawer is configured to seat at least one additive container. The dispensing system is configured to selectively dispense an additive contained within an additive container in the drawer from a first outlet, and is configured to dispense a fluid from a second outlet separate from the first outlet.

10 Claims, 20 Drawing Sheets

(56) References Cited

U.S. PATENT DOCUMENTS

| | | | |
|---|---|---|---|
| 3,179,292 A | 4/1965 | Terry | |
| 3,357,601 A | 12/1967 | Crawford et al. | |
| 3,419,193 A | 12/1968 | Stewart et al. | |
| 3,596,809 A | 8/1971 | Taubenheim | |
| 3,752,362 A | 8/1973 | Risener | |
| 3,923,183 A | 12/1975 | Choksi et al. | |
| 4,030,634 A | 6/1977 | Osborn | |
| 4,062,466 A | 12/1977 | Conti | |
| 4,073,294 A | 2/1978 | Stanley et al. | |
| 4,103,803 A | 8/1978 | Irvine | |
| 4,153,181 A | 5/1979 | Parker et al. | |
| 4,174,743 A | 11/1979 | Beny et al. | |
| 4,190,169 A | 2/1980 | Pehr | |
| 4,211,342 A * | 7/1980 | Jamgochian | G07F 13/065 222/129.4 |
| 4,212,414 A | 7/1980 | Beyens | |
| 4,251,473 A | 2/1981 | Gilbey | |
| 4,323,090 A | 4/1982 | Magi | |
| 4,323,171 A | 4/1982 | Whorton et al. | |
| 4,392,588 A * | 7/1983 | Scalera | G07F 13/10 239/422 |
| 4,408,701 A | 10/1983 | Jeans | |
| 4,411,369 A | 10/1983 | Borows | |
| 4,436,227 A | 3/1984 | Johnson et al. | |
| 4,518,541 A | 5/1985 | Harris | |
| 4,533,068 A | 8/1985 | Meierhoefer | |
| 4,555,371 A | 11/1985 | Jeans | |
| 4,558,484 A | 12/1985 | Groth | |
| 4,561,656 A | 12/1985 | David | |
| 4,567,993 A | 2/1986 | Albrecht et al. | |
| 4,676,287 A | 6/1987 | Fitzwater | |
| 4,706,847 A | 11/1987 | Sankey et al. | |
| 4,726,494 A | 2/1988 | Scott | |
| 4,752,138 A | 6/1988 | Rufer | |
| 4,836,414 A | 6/1989 | Credle et al. | |
| 4,866,324 A | 9/1989 | Yuzawa et al. | |
| 5,003,790 A | 4/1991 | Goupil | |
| 5,038,976 A | 8/1991 | Mcmillin | |
| 5,045,077 A | 9/1991 | Blake, III | |
| 5,102,010 A | 4/1992 | Osgar et al. | |
| RE33,969 E | 6/1992 | Richter | |
| 5,128,574 A | 7/1992 | Koizumi et al. | |
| 5,156,871 A | 10/1992 | Goulet et al. | |
| 5,170,912 A | 12/1992 | Du | |
| 5,185,007 A | 2/1993 | Middaugh et al. | |
| 5,199,609 A | 4/1993 | Ash, Jr. | |
| 5,205,440 A | 4/1993 | Matsushita | |
| 5,219,185 A | 6/1993 | Oddenino | |
| 5,299,608 A | 4/1994 | Bosyj | |
| 5,330,154 A | 7/1994 | Mashburn et al. | |
| 5,390,854 A | 2/1995 | Hench | |
| 5,415,329 A | 5/1995 | Westlund | |
| 5,425,404 A | 6/1995 | Dyer | |
| 5,495,725 A | 3/1996 | Middlemiss | |
| 5,507,436 A | 4/1996 | Ruttenberg | |
| 5,526,853 A | 6/1996 | Mcphee et al. | |
| 5,540,355 A | 7/1996 | Hancock et al. | |
| 5,549,228 A | 8/1996 | Brown | |
| 5,573,046 A | 11/1996 | Venooker et al. | |
| 5,638,991 A | 6/1997 | Todden et al. | |
| 5,642,761 A | 7/1997 | Holbrook | |
| 5,651,482 A | 7/1997 | Sizemore | |
| 5,697,115 A | 12/1997 | Sciarra et al. | |
| 5,803,320 A * | 9/1998 | Cutting | B67D 1/0871 222/129.1 |
| 5,816,448 A | 10/1998 | Kobold | |
| 5,836,483 A | 11/1998 | Disel | |
| 5,842,682 A | 12/1998 | Schennum et al. | |
| 5,862,948 A | 1/1999 | Duchon et al. | |
| 5,865,474 A | 2/1999 | Takahashi | |
| 5,870,944 A | 2/1999 | Vander et al. | |
| 5,884,679 A | 3/1999 | Hansen et al. | |
| 5,897,033 A | 4/1999 | Okawa et al. | |
| 5,901,880 A | 5/1999 | Clarke | |
| 5,924,606 A | 7/1999 | Huizing | |
| 5,947,171 A | 9/1999 | Woodruff | |
| 5,960,701 A * | 10/1999 | Reese | G07F 13/065 222/146.6 |
| 5,971,179 A | 10/1999 | Christmas et al. | |
| 5,975,164 A | 11/1999 | Whaley et al. | |
| 5,996,620 A | 12/1999 | Bensley | |
| 6,012,596 A | 1/2000 | Oglesbee et al. | |
| 6,014,970 A | 1/2000 | Ivri et al. | |
| 6,081,962 A | 7/2000 | Kasen et al. | |
| 6,082,586 A | 7/2000 | Banks | |
| 6,092,569 A | 7/2000 | Simmel et al. | |
| 6,095,677 A | 8/2000 | Karkos et al. | |
| 6,142,750 A | 11/2000 | Benecke | |
| 6,158,486 A | 12/2000 | Olson et al. | |
| 6,167,586 B1 | 1/2001 | Reed et al. | |
| 6,170,543 B1 | 1/2001 | Simmel et al. | |
| 6,179,167 B1 | 1/2001 | Boot et al. | |
| 6,209,753 B1 | 4/2001 | Ohu | |
| 6,223,791 B1 | 5/2001 | Arsenault et al. | |
| 6,257,453 B1 | 7/2001 | Graham | |
| 6,269,837 B1 | 8/2001 | Arent et al. | |
| 6,276,560 B1 | 8/2001 | Belcastro | |
| 6,283,330 B1 | 9/2001 | Gillespie et al. | |
| 6,321,941 B1 | 11/2001 | Argentieri et al. | |
| 6,325,115 B1 | 12/2001 | Cowland et al. | |
| 6,336,603 B1 | 1/2002 | Karkos et al. | |
| 6,363,235 B1 | 3/2002 | Chiesa et al. | |
| 6,386,392 B1 | 5/2002 | Argentieri et al. | |
| 6,390,335 B1 | 5/2002 | Lawson et al. | |
| 6,427,730 B2 | 8/2002 | Nagel et al. | |
| 6,450,214 B1 | 9/2002 | Dyer et al. | |
| 6,488,058 B1 | 12/2002 | Dyer et al. | |
| 6,601,734 B1 | 8/2003 | Smith | |
| 6,609,732 B1 | 8/2003 | Souvatzidis et al. | |
| 6,672,477 B2 | 1/2004 | Miller et al. | |
| 6,672,481 B2 | 1/2004 | Ziesel | |
| 6,685,056 B1 | 2/2004 | Argentieri et al. | |
| 6,688,499 B2 | 2/2004 | Zhang | |
| 6,712,497 B2 | 3/2004 | Jersey et al. | |
| 6,735,811 B2 | 5/2004 | Field et al. | |
| 6,758,372 B2 | 7/2004 | Studer et al. | |
| 6,771,925 B2 | 8/2004 | Satoh | |
| 6,820,763 B2 | 11/2004 | Bilskie et al. | |
| 6,832,706 B2 | 12/2004 | Hearld et al. | |
| 6,866,164 B2 | 3/2005 | Branson et al. | |
| 6,893,180 B2 | 5/2005 | Hall et al. | |
| 6,923,345 B1 | 8/2005 | Laible | |
| 6,951,295 B1 | 10/2005 | Gaus et al. | |
| 6,971,549 B2 | 12/2005 | Leifheit et al. | |
| 6,973,945 B2 | 12/2005 | Haimi | |
| 7,051,399 B2 | 5/2006 | Field et al. | |
| 7,051,888 B2 | 5/2006 | Antier et al. | |
| 7,083,071 B1 | 8/2006 | Crisp et al. | |
| 7,097,074 B2 | 8/2006 | Halliday et al. | |
| 7,104,531 B2 | 9/2006 | Page et al. | |
| 7,108,156 B2 | 9/2006 | Fox | |
| 7,114,707 B2 | 10/2006 | Rona et al. | |
| 7,121,437 B2 | 10/2006 | Kasting | |
| 7,121,438 B2 | 10/2006 | Hoepner et al. | |
| 7,131,556 B2 | 11/2006 | Tseng | |
| 7,134,575 B2 | 11/2006 | Vogel et al. | |
| 7,140,519 B1 | 11/2006 | Kiser | |
| 7,156,247 B2 | 1/2007 | Laburu | |
| 7,156,324 B2 | 1/2007 | Birrenkott et al. | |
| 7,163,127 B2 | 1/2007 | Seelhofer | |
| 7,165,568 B2 | 1/2007 | Kessell et al. | |
| 7,165,695 B2 | 1/2007 | Choi | |
| 7,178,743 B2 | 2/2007 | Clarke et al. | |
| 7,213,506 B2 | 5/2007 | Halliday et al. | |
| 7,219,598 B2 | 5/2007 | Halliday et al. | |
| 7,231,869 B2 | 6/2007 | Halliday et al. | |
| 7,246,724 B2 | 7/2007 | Dave | |
| 7,255,039 B2 | 8/2007 | Halliday et al. | |
| 7,287,461 B2 | 10/2007 | Halliday et al. | |
| 7,288,276 B2 | 10/2007 | Rona et al. | |
| 7,305,986 B1 | 12/2007 | Steiner et al. | |
| 7,316,178 B2 | 1/2008 | Halliday et al. | |
| 7,322,277 B2 | 1/2008 | Halliday et al. | |
| 7,328,815 B2 | 2/2008 | Lowe | |

(56) References Cited

U.S. PATENT DOCUMENTS

| | | |
|---|---|---|
| 7,364,702 B2 | 4/2008 | Hoffman et al. |
| 7,383,966 B2 * | 6/2008 | Ziesel ............... B67D 1/0051 |
| | | 222/1 |
| 7,407,117 B2 | 8/2008 | Dodd |
| 7,418,899 B2 | 9/2008 | Halliday et al. |
| 7,445,133 B2 | 11/2008 | Ludovissie et al. |
| 7,458,486 B2 | 12/2008 | Weist et al. |
| 7,510,095 B2 | 3/2009 | Comeau et al. |
| 7,513,192 B2 | 4/2009 | Sullivan et al. |
| 7,533,439 B2 | 5/2009 | Theiss et al. |
| 7,533,603 B2 | 5/2009 | Halliday et al. |
| 7,533,604 B2 | 5/2009 | Halliday et al. |
| 7,544,289 B2 | 6/2009 | Straka et al. |
| 7,578,415 B2 | 8/2009 | Ziesel et al. |
| 7,592,027 B2 | 9/2009 | Halliday et al. |
| 7,607,385 B2 | 10/2009 | Halliday et al. |
| 7,607,591 B2 | 10/2009 | Barch et al. |
| 7,617,954 B2 | 11/2009 | Skillin |
| 7,621,426 B2 | 11/2009 | Reynolds et al. |
| 7,644,843 B1 | 1/2010 | Bush et al. |
| 7,648,049 B1 | 1/2010 | Lassota |
| 7,651,002 B2 | 1/2010 | Hennemann et al. |
| 7,669,737 B2 | 3/2010 | Bethuy et al. |
| 7,669,738 B1 | 3/2010 | Byers |
| 7,673,558 B2 | 3/2010 | Panesar et al. |
| 7,681,492 B2 | 3/2010 | Suggi et al. |
| 7,686,441 B2 | 3/2010 | Hashii et al. |
| 7,690,392 B1 | 4/2010 | Sarkiss |
| 7,703,381 B2 | 4/2010 | Liverani et al. |
| 7,731,066 B2 | 6/2010 | Norris et al. |
| 7,731,161 B2 | 6/2010 | Seiwert et al. |
| 7,735,665 B2 | 6/2010 | Robinson |
| 7,762,438 B2 | 7/2010 | Skillin |
| 7,770,758 B2 | 8/2010 | Le Maner |
| 7,780,043 B2 | 8/2010 | Jourdin et al. |
| 7,784,311 B2 | 8/2010 | Santoemma et al. |
| 7,789,273 B2 | 9/2010 | Kadyk et al. |
| 7,806,294 B2 | 10/2010 | Gatipon et al. |
| 7,819,381 B2 | 10/2010 | Abe |
| 7,823,756 B2 | 11/2010 | Alley |
| 7,832,593 B2 | 11/2010 | Raterman et al. |
| 7,837,132 B2 | 11/2010 | Mazooji et al. |
| 7,841,491 B2 | 11/2010 | Contiero |
| 7,849,872 B2 | 12/2010 | Phillips et al. |
| 7,854,354 B2 | 12/2010 | Laible |
| 7,857,910 B2 | 12/2010 | Carhuff et al. |
| 7,878,372 B1 | 2/2011 | Camejo |
| 7,896,203 B2 | 3/2011 | Myron |
| 7,975,881 B1 | 7/2011 | Glucksman et al. |
| 7,975,883 B2 | 7/2011 | Laib et al. |
| 7,975,988 B2 | 7/2011 | Thomson et al. |
| 7,980,421 B2 | 7/2011 | Ophardt et al. |
| 8,006,853 B2 | 8/2011 | Delage |
| 8,006,866 B2 | 8/2011 | Minard et al. |
| 8,020,733 B2 | 9/2011 | Snodgrass |
| 8,052,257 B2 | 11/2011 | Gonzales |
| 8,074,837 B2 * | 12/2011 | Nevarez ............... B67D 1/07 |
| | | 222/367 |
| 8,083,100 B2 | 12/2011 | Minard et al. |
| 8,087,347 B2 | 1/2012 | Halliday et al. |
| 8,087,545 B2 | 1/2012 | Ciavarella et al. |
| 8,113,384 B2 | 2/2012 | Bethuy et al. |
| 8,172,453 B2 | 5/2012 | Boussemart et al. |
| 8,210,736 B2 | 7/2012 | Raber |
| 8,282,268 B2 | 10/2012 | Karkos et al. |
| 8,292,101 B1 | 10/2012 | Bragg et al. |
| 8,317,050 B2 | 11/2012 | Hollis et al. |
| 8,376,173 B2 | 2/2013 | Britto et al. |
| 8,376,182 B2 | 2/2013 | Lepage |
| 8,381,925 B2 | 2/2013 | Skillin et al. |
| 8,403,179 B1 | 3/2013 | Gerber |
| 8,430,134 B2 | 4/2013 | Gill |
| 8,434,639 B2 | 5/2013 | Markert |
| 8,448,804 B2 | 5/2013 | Luburic |
| 8,479,950 B2 | 7/2013 | Ophardt et al. |
| 8,517,212 B2 | 8/2013 | Antal, Sr. |
| 8,523,025 B2 | 9/2013 | Skillin et al. |
| 8,544,692 B2 | 10/2013 | Rusch et al. |
| 8,555,774 B2 | 10/2013 | Patera et al. |
| 8,584,578 B2 | 11/2013 | Koopman et al. |
| 8,590,746 B2 | 11/2013 | Bethuy et al. |
| 8,616,412 B2 | 12/2013 | Bethuy et al. |
| 8,621,990 B2 | 1/2014 | Fang et al. |
| 8,635,740 B2 | 1/2014 | Gordon et al. |
| 8,651,333 B2 | 2/2014 | Metropulos et al. |
| 8,661,966 B2 | 3/2014 | Stearns et al. |
| 8,668,376 B2 | 3/2014 | Krauchi et al. |
| 8,677,888 B2 | 3/2014 | Santoiemmo |
| 8,685,477 B2 | 4/2014 | Almblad et al. |
| 8,690,026 B2 | 4/2014 | Richards et al. |
| 8,727,515 B2 | 5/2014 | Dowell et al. |
| 8,733,566 B2 | 5/2014 | Druitt et al. |
| 8,746,506 B2 | 6/2014 | Jersey et al. |
| 8,757,227 B2 | 6/2014 | Girard et al. |
| 8,757,452 B2 | 6/2014 | Richards et al. |
| 8,770,094 B2 | 7/2014 | Rithener et al. |
| 8,794,126 B2 | 8/2014 | Skalski et al. |
| 8,807,392 B2 | 8/2014 | Smeller et al. |
| 8,807,824 B2 | 8/2014 | Bodum |
| 8,820,577 B2 | 9/2014 | Rusch et al. |
| 8,826,688 B2 | 9/2014 | Tachibana et al. |
| 8,833,241 B2 | 9/2014 | Santoiemmo |
| 8,833,584 B2 | 9/2014 | Groubert |
| 8,833,586 B2 | 9/2014 | Meyers et al. |
| 8,840,092 B2 | 9/2014 | Kumar et al. |
| 8,844,555 B2 | 9/2014 | Schneider |
| 8,846,121 B2 | 9/2014 | Hansen et al. |
| 8,863,991 B2 | 10/2014 | Cleary et al. |
| 8,887,958 B2 | 11/2014 | Kadyk et al. |
| 8,887,959 B2 | 11/2014 | Hill et al. |
| 8,889,203 B2 | 11/2014 | York |
| 8,916,215 B2 | 12/2014 | Yoakim et al. |
| 8,919,240 B2 | 12/2014 | Ozanne et al. |
| 8,919,669 B2 | 12/2014 | Sandahl |
| 8,960,500 B2 | 2/2015 | Van Opstal et al. |
| 8,960,506 B2 | 2/2015 | Beilke et al. |
| 8,985,395 B2 | 3/2015 | Tansey |
| 8,985,396 B2 | 3/2015 | Jersey et al. |
| 8,985,561 B2 | 3/2015 | Hatherell |
| 8,993,018 B2 | 3/2015 | Bucher et al. |
| 8,998,035 B2 | 4/2015 | Ford |
| 9,010,237 B2 | 4/2015 | Ozanne et al. |
| 9,026,245 B2 | 5/2015 | Tilton et al. |
| 9,027,466 B2 | 5/2015 | Bucher et al. |
| 9,044,718 B2 | 6/2015 | Ludwig et al. |
| 9,045,722 B2 | 6/2015 | Reif et al. |
| 9,051,162 B2 | 6/2015 | Peters et al. |
| 9,056,287 B2 | 6/2015 | Peltola et al. |
| 9,060,650 B2 | 6/2015 | De Longhi |
| 9,073,673 B2 | 7/2015 | Mazurkiewicz et al. |
| 9,084,510 B2 | 7/2015 | Scorrano et al. |
| 9,107,448 B2 | 8/2015 | Giardino et al. |
| 9,107,449 B2 | 8/2015 | Njaastad et al. |
| 9,107,533 B2 | 8/2015 | Volz et al. |
| 9,114,368 B2 | 8/2015 | Njaastad et al. |
| 9,155,330 B1 | 10/2015 | Shtivelman |
| 9,155,418 B2 | 10/2015 | Lai et al. |
| 9,156,670 B2 | 10/2015 | Hill et al. |
| 9,161,654 B2 | 10/2015 | Belmont |
| 9,166,448 B2 | 10/2015 | Lam et al. |
| 9,167,935 B2 * | 10/2015 | Scholvinck ........... A47J 31/402 |
| 9,169,048 B2 | 10/2015 | Ludewigs et al. |
| 9,193,506 B2 | 11/2015 | Madison et al. |
| 9,233,824 B2 | 1/2016 | Alan et al. |
| 9,290,317 B2 | 3/2016 | Quinn et al. |
| 9,295,278 B2 | 3/2016 | Nowak |
| 9,320,382 B2 | 4/2016 | Lo Faro et al. |
| 9,320,385 B2 | 4/2016 | Spiegel et al. |
| 9,334,090 B1 | 5/2016 | Maple et al. |
| 9,352,897 B2 | 5/2016 | Hoshino |
| 9,364,018 B1 | 6/2016 | Peterson et al. |
| 9,371,176 B2 | 6/2016 | Kohli et al. |
| 9,375,686 B2 | 6/2016 | Boarman et al. |
| 9,388,033 B2 | 7/2016 | Gates |

(56) References Cited

U.S. PATENT DOCUMENTS

| | | | |
|---|---|---|---|
| 9,396,605 B2 * | 7/2016 | Righetti | A47J 31/401 |
| 9,409,680 B2 | 8/2016 | Van Alfen et al. | |
| 9,409,757 B2 | 8/2016 | Reddy | |
| 9,409,759 B2 | 8/2016 | Wilder et al. | |
| 9,433,317 B2 | 9/2016 | Agon et al. | |
| 9,433,328 B2 | 9/2016 | Ciavarella et al. | |
| 9,434,532 B2 | 9/2016 | Yoakim et al. | |
| 9,440,836 B2 | 9/2016 | Quittner et al. | |
| 9,445,688 B2 | 9/2016 | Flick | |
| 9,458,003 B1 | 10/2016 | Laible | |
| 9,469,463 B2 | 10/2016 | Murray et al. | |
| 9,481,508 B2 | 11/2016 | Oh | |
| 9,486,102 B2 | 11/2016 | Baldo | |
| 9,493,298 B2 | 11/2016 | Evans et al. | |
| 9,504,348 B2 | 11/2016 | Windler et al. | |
| 9,505,510 B2 | 11/2016 | Hatherell | |
| 9,516,969 B2 | 12/2016 | Weflen | |
| 9,521,924 B2 | 12/2016 | Priley et al. | |
| 9,527,047 B2 | 12/2016 | Ring et al. | |
| 9,538,876 B2 | 1/2017 | Ozanne et al. | |
| D779,046 S | 2/2017 | Tansey, Jr. | |
| 9,580,216 B2 | 2/2017 | Wisniewski | |
| 9,582,699 B2 | 2/2017 | Jarisch et al. | |
| 9,593,005 B2 | 3/2017 | Jersey et al. | |
| 9,617,138 B2 * | 4/2017 | Mosimann | B67D 1/0022 |
| 9,630,157 B2 | 4/2017 | Li et al. | |
| 9,651,188 B2 | 5/2017 | Green et al. | |
| 9,661,951 B2 | 5/2017 | Bugnano et al. | |
| 9,664,264 B2 | 5/2017 | Kristlbauer | |
| 9,668,604 B2 | 6/2017 | Yoakim et al. | |
| 9,669,973 B2 | 6/2017 | Hoshino et al. | |
| 9,687,796 B2 | 6/2017 | Hoare et al. | |
| 9,701,527 B2 | 7/2017 | Tansey, Jr. | |
| 9,708,109 B2 | 7/2017 | Marina et al. | |
| 9,714,162 B2 | 7/2017 | Hecht et al. | |
| 9,717,366 B2 | 8/2017 | Nevin et al. | |
| 9,718,035 B2 | 8/2017 | Bandixen et al. | |
| 9,723,863 B2 | 8/2017 | Njaastad et al. | |
| 9,730,547 B2 | 8/2017 | Tanner et al. | |
| 9,743,801 B2 | 8/2017 | Leuzinger et al. | |
| 9,745,120 B2 | 8/2017 | Abegglen et al. | |
| 9,745,185 B2 | 8/2017 | Klopfenstein et al. | |
| 9,751,054 B2 | 9/2017 | Jin et al. | |
| 9,754,437 B2 | 9/2017 | Deo et al. | |
| 9,770,129 B2 | 9/2017 | Remo et al. | |
| 9,783,403 B2 | 10/2017 | Tansey, Jr. | |
| 9,783,405 B2 | 10/2017 | Olson et al. | |
| 9,788,681 B2 | 10/2017 | Perentes et al. | |
| 9,790,076 B2 | 10/2017 | Novak et al. | |
| 9,796,506 B2 | 10/2017 | Meager | |
| 9,801,500 B2 | 10/2017 | Ven Der Woning | |
| 9,809,437 B2 | 11/2017 | Tansey, Jr. | |
| 9,811,704 B2 | 11/2017 | Kaeser | |
| 9,821,951 B2 | 11/2017 | Estabrook et al. | |
| 9,821,992 B2 | 11/2017 | Rudick et al. | |
| 9,854,935 B2 | 1/2018 | Danieli et al. | |
| 9,889,239 B2 | 2/2018 | Michaels et al. | |
| 9,889,966 B2 | 2/2018 | Medeiros et al. | |
| 9,896,322 B2 | 2/2018 | Hecht | |
| 9,897,220 B2 | 2/2018 | Cohen et al. | |
| 9,907,432 B2 | 3/2018 | Tanner et al. | |
| 9,918,586 B2 | 3/2018 | Smith et al. | |
| 9,957,145 B2 | 5/2018 | Cohen et al. | |
| 9,974,410 B2 | 5/2018 | Ferrier | |
| 9,980,596 B2 | 5/2018 | Rognon et al. | |
| 9,981,801 B2 | 5/2018 | Ozanne et al. | |
| 9,999,315 B2 | 6/2018 | Crarer et al. | |
| 9,999,316 B2 | 6/2018 | Ye et al. | |
| 10,000,370 B2 | 6/2018 | Bethuy et al. | |
| 10,007,397 B2 | 6/2018 | Besson et al. | |
| 10,017,372 B2 | 7/2018 | Bethuy et al. | |
| 10,022,011 B2 | 7/2018 | Norton et al. | |
| 10,028,614 B2 | 7/2018 | Perentes et al. | |
| 10,034,573 B2 | 7/2018 | Flick et al. | |
| 10,046,903 B2 | 8/2018 | Evans et al. | |
| 10,046,904 B2 | 8/2018 | Evans et al. | |
| 10,051,988 B2 | 8/2018 | Gordon et al. | |
| 10,058,826 B2 | 8/2018 | Cohen et al. | |
| 10,064,513 B2 | 9/2018 | Rehfuss | |
| 10,070,751 B2 | 9/2018 | Magniet et al. | |
| 10,076,208 B2 | 9/2018 | Castellani et al. | |
| 10,080,461 B2 | 9/2018 | Bugnano et al. | |
| 10,093,530 B2 | 10/2018 | Mackey et al. | |
| 10,099,443 B1 | 10/2018 | Evans et al. | |
| 10,106,392 B2 | 10/2018 | Peirsman et al. | |
| 10,117,539 B2 | 11/2018 | Rognon et al. | |
| 10,117,540 B2 | 11/2018 | De Vreede et al. | |
| 10,130,211 B2 | 11/2018 | Bugnano et al. | |
| 10,131,528 B2 | 11/2018 | Webster et al. | |
| 10,131,529 B2 | 11/2018 | Jersey et al. | |
| 10,136,755 B2 | 11/2018 | Talon | |
| 10,143,782 B2 | 12/2018 | Yurek et al. | |
| 10,143,978 B2 | 12/2018 | Tipton | |
| 10,149,569 B2 | 12/2018 | Preshel | |
| 10,155,647 B2 | 12/2018 | Foster et al. | |
| 10,159,376 B2 | 12/2018 | Dovat et al. | |
| 10,160,575 B2 | 12/2018 | Ray | |
| 10,165,892 B2 | 1/2019 | Lafosse | |
| 10,189,614 B2 | 1/2019 | Pruiett | |
| 10,193,411 B2 | 1/2019 | Tajima et al. | |
| 10,201,171 B2 | 2/2019 | Gordon et al. | |
| 10,201,785 B2 | 2/2019 | Cohen et al. | |
| 10,206,533 B2 | 2/2019 | Pirone | |
| 10,211,438 B2 | 2/2019 | Ohashi et al. | |
| 10,213,033 B2 | 2/2019 | Bratsch et al. | |
| 10,213,752 B2 | 2/2019 | Shalev | |
| 10,214,018 B2 | 2/2019 | Nozawa et al. | |
| 10,227,226 B2 | 3/2019 | Jersey et al. | |
| 10,229,401 B2 | 3/2019 | Yoakim | |
| 10,231,569 B2 | 3/2019 | Perentes et al. | |
| 10,233,002 B2 | 3/2019 | Baenninger et al. | |
| 10,239,669 B2 | 3/2019 | Ayriss et al. | |
| 10,258,186 B2 | 4/2019 | Rivera | |
| 10,280,060 B2 * | 5/2019 | van Opstal | B67D 1/0043 |
| 10,294,020 B2 | 5/2019 | Nordqvist et al. | |
| 10,307,718 B2 | 6/2019 | Waisman | |
| 10,329,134 B2 | 6/2019 | Olson et al. | |
| 10,334,871 B2 | 7/2019 | Van De Sluis et al. | |
| 10,336,597 B2 | 7/2019 | Griscik et al. | |
| 10,343,885 B2 | 7/2019 | Novak et al. | |
| 10,349,773 B2 | 7/2019 | Segiet et al. | |
| 10,350,561 B1 | 7/2019 | Dushine et al. | |
| 10,358,269 B2 | 7/2019 | Cerveny | |
| 10,364,089 B2 | 7/2019 | Daniels et al. | |
| 10,365,141 B2 | 7/2019 | Freiburger et al. | |
| 10,370,235 B2 | 8/2019 | Pellaud | |
| 10,377,540 B2 | 8/2019 | Borgardt et al. | |
| 10,377,620 B2 | 8/2019 | Makino et al. | |
| 10,384,839 B2 | 8/2019 | Yamaguchi | |
| 10,398,254 B2 | 9/2019 | Tinkler et al. | |
| 10,399,769 B2 | 9/2019 | Talon et al. | |
| 10,399,838 B2 | 9/2019 | Green | |
| 10,399,839 B2 | 9/2019 | Knoll et al. | |
| 10,405,690 B2 | 9/2019 | Tentorio | |
| 10,405,691 B2 | 9/2019 | Hesselbrock et al. | |
| 10,414,557 B2 | 9/2019 | Skillin et al. | |
| 10,414,642 B2 | 9/2019 | Melville, Jr. et al. | |
| 10,433,668 B2 | 10/2019 | Merali et al. | |
| 10,433,671 B2 | 10/2019 | Surface | |
| 10,442,591 B2 | 10/2019 | Rognard et al. | |
| 10,455,968 B1 | 10/2019 | Singer | |
| 10,455,973 B2 | 10/2019 | Dollner et al. | |
| 10,455,974 B2 | 10/2019 | Talon | |
| 10,456,539 B2 | 10/2019 | Hearn et al. | |
| 10,456,757 B1 | 10/2019 | Blichmann | |
| 10,457,450 B2 | 10/2019 | Rios | |
| 10,470,605 B2 | 11/2019 | Ergican et al. | |
| 10,479,669 B2 | 11/2019 | Kim et al. | |
| 10,485,374 B2 | 11/2019 | Lo Faro et al. | |
| 10,486,953 B2 | 11/2019 | Pellaud et al. | |
| 10,488,097 B2 | 11/2019 | Nachawati et al. | |
| 10,494,246 B2 | 12/2019 | Hecht et al. | |
| 10,506,896 B2 | 12/2019 | Ven Der Woning | |
| 10,507,958 B2 | 12/2019 | Hashimoto et al. | |

(56) References Cited

U.S. PATENT DOCUMENTS

| | | |
|---|---|---|
| 10,513,424 B2 | 12/2019 | Tansey, Jr. |
| 10,518,938 B2 | 12/2019 | Suzuki et al. |
| 10,518,942 B2 | 12/2019 | Seibert et al. |
| 10,519,020 B2 | 12/2019 | Ozawa et al. |
| 10,524,617 B2 | 1/2020 | Perrin et al. |
| 10,526,186 B2 | 1/2020 | Kuboi et al. |
| 10,526,192 B2 | 1/2020 | Holley et al. |
| 10,543,977 B2 | 1/2020 | Brockman et al. |
| 10,548,430 B2 | 2/2020 | Guard et al. |
| 10,555,636 B2 | 2/2020 | Carr et al. |
| 10,562,700 B2 | 2/2020 | Weijers et al. |
| 10,568,452 B2 | 2/2020 | Fin et al. |
| 10,595,549 B2 | 3/2020 | Van De Sluis et al. |
| 10,595,668 B2 | 3/2020 | Tinkler et al. |
| 10,596,305 B2 | 3/2020 | Roberts et al. |
| 10,604,310 B2 | 3/2020 | Kutsuzawa et al. |
| 10,604,398 B2 | 3/2020 | Smeller et al. |
| 10,631,686 B2 | 4/2020 | Abdo et al. |
| 10,647,564 B2 | 5/2020 | Showalter |
| 10,654,700 B2 | 5/2020 | Hecht |
| 10,674,857 B2 | 6/2020 | Lyons et al. |
| 10,674,863 B2 | 6/2020 | Sevcik et al. |
| 10,676,336 B2 | 6/2020 | Makino et al. |
| 10,682,007 B2 | 6/2020 | Fischer |
| 10,682,593 B2 | 6/2020 | Baird |
| 10,702,835 B2 | 7/2020 | Tran et al. |
| 10,702,838 B2 | 7/2020 | Chaussin et al. |
| 10,703,618 B2 | 7/2020 | Ziesel |
| 10,707,734 B2 | 7/2020 | Holenstein et al. |
| 10,710,864 B2 | 7/2020 | Jangbarwala et al. |
| 10,717,567 B2 | 7/2020 | Sakamoto et al. |
| 10,717,637 B2 | 7/2020 | Pellaud et al. |
| 10,743,707 B2 | 8/2020 | Bugnano et al. |
| 10,759,594 B2 | 9/2020 | Mills et al. |
| 10,765,254 B2 | 9/2020 | Iotti et al. |
| 10,766,756 B2 | 9/2020 | Gatipon et al. |
| 10,772,460 B2 | 9/2020 | Accursi |
| 10,780,408 B2 | 9/2020 | Schöb et al. |
| 10,791,752 B2 | 10/2020 | Siegel et al. |
| 10,793,346 B2 | 10/2020 | Bartoli et al. |
| 10,800,581 B2 | 10/2020 | Berroa Garcia |
| 10,807,049 B2 | 10/2020 | Abdo et al. |
| 10,807,853 B2 | 10/2020 | Balstad et al. |
| 10,813,501 B2 | 10/2020 | Helf et al. |
| 10,820,741 B2 | 11/2020 | Byun et al. |
| 10,820,744 B2 | 11/2020 | Rubin et al. |
| 10,820,745 B2 | 11/2020 | Zwicker et al. |
| 10,820,746 B2 | 11/2020 | Noth |
| 10,827,875 B2 | 11/2020 | Noth |
| 10,828,586 B2 | 11/2020 | Simpson et al. |
| 10,829,359 B2 | 11/2020 | Von Kraus et al. |
| 10,842,313 B2 | 11/2020 | Novak et al. |
| 10,843,142 B2 | 11/2020 | Waggoner et al. |
| 10,843,849 B1 | 11/2020 | Berge |
| 10,843,866 B2 | 11/2020 | Cafaro et al. |
| 10,846,975 B2 | 11/2020 | Tansey et al. |
| 10,849,451 B2 | 12/2020 | Su |
| 10,849,454 B2 | 12/2020 | Gordon et al. |
| 10,869,572 B2 | 12/2020 | Blatt |
| 10,870,566 B2 | 12/2020 | Green et al. |
| 10,882,728 B2 | 1/2021 | Hong et al. |
| 10,883,072 B2 | 1/2021 | Hong et al. |
| 10,893,773 B2 | 1/2021 | Standaar et al. |
| 10,894,639 B2 | 1/2021 | Pruiett |
| 10,894,706 B2 | 1/2021 | Iotti et al. |
| 10,898,026 B2 | 1/2021 | Fin |
| 10,899,600 B2 | 1/2021 | Frieburger et al. |
| 10,905,287 B2 | 2/2021 | Tu et al. |
| 10,906,013 B2 | 2/2021 | Cohen et al. |
| 10,918,238 B2 * | 2/2021 | Bhutani ............ A47J 31/402 |
| 10,918,239 B2 | 2/2021 | Hartmann et al. |
| 10,919,752 B2 | 2/2021 | Breault |
| 10,925,433 B2 | 2/2021 | Hansen et al. |
| 10,926,945 B2 | 2/2021 | Kennedy et al. |
| 10,926,995 B2 | 2/2021 | Seay et al. |
| 10,940,494 B2 | 3/2021 | Romanov et al. |
| 10,945,554 B2 | 3/2021 | Lo Faro et al. |
| 10,945,557 B2 | 3/2021 | Nishimura et al. |
| 10,947,485 B2 | 3/2021 | Min et al. |
| 10,952,562 B2 | 3/2021 | Tanner et al. |
| 10,954,043 B2 | 3/2021 | Taruno |
| 10,961,027 B1 | 3/2021 | Laible |
| 10,966,563 B2 | 4/2021 | Dubief et al. |
| 10,966,564 B2 | 4/2021 | Rijskamp et al. |
| 10,973,364 B2 | 4/2021 | Hesselbrock et al. |
| 10,981,700 B2 | 4/2021 | Migas et al. |
| 10,989,026 B2 | 4/2021 | Al-gouhi et al. |
| 10,993,575 B2 | 5/2021 | Krug et al. |
| 10,993,576 B2 | 5/2021 | Fedorak et al. |
| 10,994,980 B2 | 5/2021 | Jangbarwala et al. |
| 11,001,490 B2 | 5/2021 | Headley et al. |
| 11,008,206 B2 | 5/2021 | Pappas |
| 11,013,363 B1 | 5/2021 | Alsudairi et al. |
| 11,021,359 B2 | 6/2021 | Bissen et al. |
| 11,026,539 B2 | 6/2021 | Zosimadis et al. |
| 11,033,141 B2 | 6/2021 | Schlack |
| 11,039,712 B2 | 6/2021 | Egli et al. |
| 11,040,806 B2 | 6/2021 | Naumann et al. |
| 11,049,354 B2 | 6/2021 | Yoakim |
| 11,053,053 B2 | 7/2021 | Jordan |
| 11,059,636 B2 | 7/2021 | Maeda |
| 11,064,715 B2 | 7/2021 | Herbert et al. |
| 11,072,521 B2 | 7/2021 | Walker |
| 11,078,066 B2 | 8/2021 | Crackel et al. |
| 11,084,007 B2 | 8/2021 | Adams |
| 11,084,701 B2 | 8/2021 | Kuboi et al. |
| 11,085,435 B2 | 8/2021 | Dobbins et al. |
| 11,097,236 B2 | 8/2021 | Alexander et al. |
| 11,109,708 B2 | 9/2021 | Lecomte et al. |
| 11,110,418 B2 | 9/2021 | Furman et al. |
| 11,124,404 B2 | 9/2021 | Von Kraus et al. |
| 11,129,490 B2 | 9/2021 | Park et al. |
| 11,129,491 B2 | 9/2021 | Park et al. |
| 11,147,410 B2 | 10/2021 | Hachenberger et al. |
| 11,148,927 B2 | 10/2021 | Wing et al. |
| 11,166,593 B2 | 11/2021 | Trakselis |
| 11,167,231 B2 | 11/2021 | Akdim et al. |
| 11,180,293 B2 | 11/2021 | Sahara et al. |
| 11,191,286 B2 | 12/2021 | Cross et al. |
| 11,192,711 B2 | 12/2021 | Jarisch et al. |
| 11,194,443 B2 | 12/2021 | Deo et al. |
| 11,203,515 B2 | 12/2021 | Cook |
| 11,206,941 B2 | 12/2021 | Abdo et al. |
| 11,208,310 B2 | 12/2021 | Tansey et al. |
| 11,208,313 B2 | 12/2021 | Conover et al. |
| 11,208,314 B2 | 12/2021 | Peirsman et al. |
| 11,235,267 B1 | 2/2022 | Santoiemmo |
| 11,242,195 B2 | 2/2022 | Nordqvist et al. |
| 11,246,326 B2 | 2/2022 | Feola |
| 11,247,186 B2 | 2/2022 | Topp-manske |
| 11,247,892 B2 | 2/2022 | Moore et al. |
| 11,250,659 B2 | 2/2022 | Tansey et al. |
| 11,252,976 B2 | 2/2022 | Popov et al. |
| 11,254,491 B2 | 2/2022 | Krüger |
| 11,254,586 B1 | 2/2022 | Santoiemmo |
| 11,274,027 B2 | 3/2022 | Krüger et al. |
| 11,284,734 B2 | 3/2022 | Hilckmann et al. |
| 11,284,736 B2 | 3/2022 | Ochoa et al. |
| 11,292,642 B2 | 4/2022 | Hiltser et al. |
| 11,292,646 B2 | 4/2022 | Bai et al. |
| 11,292,706 B2 | 4/2022 | Showalter |
| 11,292,707 B2 | 4/2022 | Lecomte et al. |
| 11,297,850 B2 | 4/2022 | Popov et al. |
| 11,304,557 B2 | 4/2022 | De Vreede et al. |
| 11,312,604 B2 | 4/2022 | Mehta et al. |
| 11,325,760 B2 | 5/2022 | Alderson et al. |
| 11,325,818 B2 | 5/2022 | Dahlberg et al. |
| 11,337,542 B2 | 5/2022 | Kroos |
| 11,339,045 B2 * | 5/2022 | Conway ............ B67D 1/0021 |
| 11,344,151 B2 | 5/2022 | Rolla |
| 11,345,581 B2 | 5/2022 | Cook |
| 11,345,583 B2 | 5/2022 | Aslam et al. |
| 11,370,648 B2 | 6/2022 | Melville, Jr. et al. |
| 11,407,629 B1 | 8/2022 | Siegel |

(56) References Cited

U.S. PATENT DOCUMENTS

| | | |
|---|---|---|
| 11,407,630 B1 | 8/2022 | Shafir |
| 11,465,892 B1 | 10/2022 | Dos Santos |
| 11,470,994 B2 | 10/2022 | Hashimoto |
| 11,479,457 B2 | 10/2022 | Krüger et al. |
| 11,498,824 B2 * | 11/2022 | Zemko ............... B67D 1/0888 |
| 11,634,314 B1 * | 4/2023 | Anthony ............... G01F 11/28 222/71 |
| 11,647,860 B1 * | 5/2023 | Anthony ............... A23L 2/56 99/275 |
| 11,745,996 B1 | 9/2023 | Zbedlick |
| 12,017,192 B1 * | 6/2024 | Chen ............... B01F 23/2362 |
| 2002/0059870 A1 | 5/2002 | Walters Jr. ............... C02F 1/003 99/298 |
| 2002/0121531 A1 | 9/2002 | Stillinger et al. |
| 2002/0130140 A1 | 9/2002 | Cote |
| 2002/0158075 A1 | 10/2002 | Caldicott et al. |
| 2003/0012849 A1 | 1/2003 | Berson |
| 2003/0102330 A1 | 6/2003 | Cote |
| 2003/0132241 A1 | 7/2003 | Treat |
| 2003/0168455 A1 | 9/2003 | Zettle et al. |
| 2004/0195245 A1 | 10/2004 | Gohil |
| 2005/0000053 A1 | 1/2005 | Kasper et al. |
| 2005/0040131 A1 | 2/2005 | Lin |
| 2005/0092392 A1 | 5/2005 | Abe |
| 2005/0095158 A1 * | 5/2005 | Kirschner ............ A47J 31/3642 417/313 |
| 2005/0151764 A1 | 7/2005 | Grady et al. |
| 2005/0184075 A1 | 8/2005 | Belcastro |
| 2005/0191759 A1 | 9/2005 | Pedersen-Bjergaard et al. |
| 2005/0241489 A1 * | 11/2005 | Kirschner ............ B65D 85/8061 99/295 |
| 2006/0071040 A1 | 4/2006 | Young |
| 2006/0124659 A1 * | 6/2006 | Mosconi ............... A47J 31/3623 221/161 |
| 2006/0124662 A1 | 6/2006 | Reynolds et al. |
| 2006/0196364 A1 * | 9/2006 | Kirschner ............ A47J 31/3623 99/295 |
| 2006/0226176 A1 | 10/2006 | Tseng |
| 2008/0029541 A1 | 2/2008 | Wallace et al. |
| 2008/0078769 A1 | 4/2008 | Crunkleton et al. |
| 2008/0237271 A1 | 10/2008 | Olechowski |
| 2008/0272144 A1 | 11/2008 | Bonney et al. |
| 2008/0287880 A1 | 11/2008 | Keller |
| 2009/0120958 A1 * | 5/2009 | Landers ............... B67D 1/0051 222/129.1 |
| 2009/0140006 A1 | 6/2009 | Vitantonio et al. |
| 2009/0214742 A1 | 8/2009 | Peden et al. |
| 2009/0236361 A1 | 9/2009 | Doelman et al. |
| 2010/0071777 A1 | 3/2010 | Smith et al. |
| 2010/0089921 A1 | 4/2010 | Ellenkamp-Van et al. |
| 2010/0170841 A1 | 7/2010 | An et al. |
| 2010/0192782 A1 | 8/2010 | Blumenauer et al. |
| 2010/0251901 A1 | 10/2010 | Santoiemmo |
| 2011/0011889 A1 | 1/2011 | Bonney et al. |
| 2011/0107545 A1 | 5/2011 | Cagnina et al. |
| 2011/0181417 A1 | 7/2011 | Haskayne et al. |
| 2011/0186535 A1 | 8/2011 | Meager |
| 2011/0290828 A1 | 12/2011 | Lolk |
| 2012/0107463 A1 * | 5/2012 | Santoiemmo ............ A23L 2/56 426/232 |
| 2012/0187153 A1 | 7/2012 | Burge et al. |
| 2012/0193318 A1 | 8/2012 | Meager |
| 2013/0062366 A1 | 3/2013 | Tansey |
| 2013/0098499 A1 | 4/2013 | Bencista et al. |
| 2013/0233878 A1 | 9/2013 | Lindmayer |
| 2014/0004241 A1 | 1/2014 | Hatherell |
| 2014/0070431 A1 | 3/2014 | Hatherell |
| 2014/0154368 A1 | 6/2014 | Kolls et al. |
| 2014/0175125 A1 | 6/2014 | Breault |
| 2014/0182715 A1 | 7/2014 | Cooper et al. |
| 2014/0231442 A1 | 8/2014 | Hill et al. |
| 2014/0263415 A1 * | 9/2014 | San Miguel ............ A23G 9/283 222/1 |
| 2014/0272019 A1 | 9/2014 | Schuh et al. |
| 2014/0331868 A1 * | 11/2014 | Novak ............... A23L 2/54 99/323.2 |
| 2015/0050392 A1 | 2/2015 | Stonehouse et al. |
| 2015/0125578 A1 | 5/2015 | Hatherell |
| 2015/0125586 A1 | 5/2015 | Ergican |
| 2015/0129613 A1 | 5/2015 | Vuong |
| 2015/0166252 A1 | 6/2015 | Jones |
| 2015/0210522 A1 | 7/2015 | Jersey et al. |
| 2015/0225169 A1 | 8/2015 | Jarisch |
| 2015/0374025 A1 | 12/2015 | Evans et al. |
| 2016/0009539 A1 | 1/2016 | Jersey et al. |
| 2016/0130076 A1 | 5/2016 | Jarisch |
| 2016/0192806 A1 | 7/2016 | Pikkemaat et al. |
| 2016/0242456 A1 | 8/2016 | Evans et al. |
| 2016/0251208 A1 | 9/2016 | Tansey, Jr. |
| 2016/0255991 A1 | 9/2016 | Givens et al. |
| 2016/0318689 A1 * | 11/2016 | Rudick ............... B65D 81/32 |
| 2016/0332124 A1 | 11/2016 | Cohen |
| 2017/0215645 A1 | 8/2017 | Doglioni Majer et al. |
| 2017/0225880 A1 | 8/2017 | Vivier et al. |
| 2017/0280750 A1 | 10/2017 | Arnaud et al. |
| 2017/0332672 A1 | 11/2017 | Kasprzycki et al. |
| 2017/0334636 A1 | 11/2017 | Park et al. |
| 2017/0341856 A1 | 11/2017 | Aschwanden |
| 2017/0370629 A1 | 12/2017 | Fire |
| 2018/0000280 A1 | 1/2018 | Dubief |
| 2018/0057337 A1 | 3/2018 | Babucke et al. |
| 2018/0086621 A1 | 3/2018 | Dubief et al. |
| 2018/0093820 A1 | 4/2018 | Massey et al. |
| 2018/0215603 A1 | 8/2018 | Hecht |
| 2018/0251358 A1 | 9/2018 | Wing et al. |
| 2018/0251361 A1 | 9/2018 | Wing et al. |
| 2018/0297830 A1 | 10/2018 | Kraenzle |
| 2018/0312386 A1 | 11/2018 | Brun-Kestler et al. |
| 2018/0354713 A1 | 12/2018 | Ting et al. |
| 2019/0053658 A1 | 2/2019 | Lecomte et al. |
| 2019/0077586 A1 | 3/2019 | Cafaro et al. |
| 2019/0134583 A1 | 5/2019 | Lautenschläger et al. |
| 2019/0144804 A1 | 5/2019 | Hong et al. |
| 2019/0146641 A1 | 5/2019 | Deo et al. |
| 2019/0153368 A1 | 5/2019 | Yoon et al. |
| 2019/0166886 A1 * | 6/2019 | Gordon ............... A23L 2/54 |
| 2019/0169016 A1 | 6/2019 | Vandekerckhove et al. |
| 2019/0191916 A1 | 6/2019 | Guyon et al. |
| 2019/0231119 A1 | 8/2019 | Kennedy et al. |
| 2019/0241420 A1 | 8/2019 | Peirsman et al. |
| 2019/0269156 A1 * | 9/2019 | Van De Sluis ............ A23L 2/54 |
| 2019/0270630 A1 | 9/2019 | Dahan et al. |
| 2019/0274469 A1 | 9/2019 | Van De Sluis |
| 2019/0274482 A1 | 9/2019 | Abdo et al. |
| 2019/0275478 A1 | 9/2019 | Jersey et al. |
| 2019/0276297 A1 | 9/2019 | Tewari |
| 2019/0290054 A1 | 9/2019 | Weber et al. |
| 2019/0291062 A1 | 9/2019 | Wood et al. |
| 2019/0291064 A1 | 9/2019 | Conroy et al. |
| 2019/0292034 A1 | 9/2019 | Wood et al. |
| 2019/0292036 A1 | 9/2019 | Rice et al. |
| 2019/0328170 A1 | 10/2019 | Cai |
| 2019/0335952 A1 | 11/2019 | Di Bari |
| 2019/0337713 A1 * | 11/2019 | Ergican ............... B65D 85/8055 |
| 2019/0344233 A1 | 11/2019 | Savino |
| 2019/0367350 A1 | 12/2019 | Bhutani et al. |
| 2020/0000272 A1 | 1/2020 | Nabeiro et al. |
| 2020/0010311 A1 | 1/2020 | Moore |
| 2020/0017806 A1 | 1/2020 | Peirsman et al. |
| 2020/0031651 A1 | 1/2020 | Schneidewend et al. |
| 2020/0047137 A1 | 2/2020 | Wilder et al. |
| 2020/0054172 A1 | 2/2020 | Trakselis |
| 2020/0060465 A1 | 2/2020 | Longman et al. |
| 2020/0062476 A1 | 2/2020 | Katayama et al. |
| 2020/0077841 A1 | 3/2020 | Dercar et al. |
| 2020/0079637 A1 | 3/2020 | Kaplita et al. |
| 2020/0100618 A1 | 4/2020 | Guyon et al. |
| 2020/0107671 A1 * | 4/2020 | Gordon ............... A47J 31/462 |
| 2020/0121115 A1 | 4/2020 | Oh |
| 2020/0122100 A1 | 4/2020 | Tumey |
| 2020/0122994 A1 * | 4/2020 | Cimatti ............... G06Q 20/145 |
| 2020/0146308 A1 * | 5/2020 | Roberts ............... A47J 31/4492 |
| 2020/0146500 A1 | 5/2020 | Cafaro et al. |

(56) References Cited

U.S. PATENT DOCUMENTS

| | | |
|---|---|---|
| 2020/0146501 A1* | 5/2020 | McHugh ............. A47J 31/3623 |
| 2020/0156019 A1 | 5/2020 | Sawyer et al. |
| 2020/0170443 A1 | 6/2020 | Chioda et al. |
| 2020/0187718 A1 | 6/2020 | Seidl |
| 2020/0198956 A1 | 6/2020 | Hartsfield et al. |
| 2020/0207603 A1* | 7/2020 | Sevcik ............. B01F 25/3141 |
| 2020/0216786 A1 | 7/2020 | Pintz |
| 2020/0229472 A1 | 7/2020 | Manne |
| 2020/0231372 A1 | 7/2020 | Parise |
| 2020/0253361 A1 | 8/2020 | Davidson |
| 2020/0281396 A1 | 9/2020 | Accursi et al. |
| 2020/0331739 A1 | 10/2020 | Mehta et al. |
| 2020/0345170 A1 | 11/2020 | Jarisch et al. |
| 2020/0359822 A1 | 11/2020 | Dercar et al. |
| 2020/0359841 A1 | 11/2020 | Dercar et al. |
| 2020/0360875 A1 | 11/2020 | Danieli et al. |
| 2020/0361758 A1 | 11/2020 | Fantappié et al. |
| 2020/0367689 A1 | 11/2020 | Illy et al. |
| 2020/0369440 A1 | 11/2020 | Croibier et al. |
| 2020/0369446 A1 | 11/2020 | Mélan-Moutet |
| 2020/0369504 A1 | 11/2020 | Balstad et al. |
| 2020/0369505 A1 | 11/2020 | Mckay |
| 2020/0375221 A1 | 12/2020 | Colvin et al. |
| 2020/0397184 A1 | 12/2020 | Ruggiero et al. |
| 2021/0000289 A1 | 1/2021 | Krüger et al. |
| 2021/0002044 A1 | 1/2021 | Koenigseder |
| 2021/0002046 A1 | 1/2021 | Da Costa et al. |
| 2021/0013785 A1 | 1/2021 | Liang et al. |
| 2021/0015303 A1 | 1/2021 | Byun et al. |
| 2021/0052104 A1 | 2/2021 | Perentes |
| 2021/0100394 A1 | 4/2021 | Affolter et al. |
| 2021/0101722 A1 | 4/2021 | Migas et al. |
| 2021/0106163 A1* | 4/2021 | Van De Sluis ......... A47J 31/46 |
| 2021/0122540 A1 | 4/2021 | Meager |
| 2021/0127891 A1 | 5/2021 | Wei |
| 2021/0127902 A1 | 5/2021 | Deng et al. |
| 2021/0137304 A1* | 5/2021 | Krüger ................. A47J 31/40 |
| 2021/0137315 A1 | 5/2021 | Byun et al. |
| 2021/0147138 A1* | 5/2021 | Affolter ............... A47J 31/407 |
| 2021/0171333 A1 | 6/2021 | Amos |
| 2021/0177189 A1 | 6/2021 | Kordich et al. |
| 2021/0179411 A1 | 6/2021 | Dahan et al. |
| 2021/0188530 A1 | 6/2021 | Pellegrini et al. |
| 2021/0196074 A1* | 7/2021 | Guarin ............... A47J 31/407 |
| 2021/0259286 A1* | 8/2021 | Siegel ................... A23L 2/60 |
| 2021/0259472 A1 | 8/2021 | Seidler et al. |
| 2021/0261324 A1 | 8/2021 | Arnold |
| 2021/0275942 A1 | 9/2021 | Stryker et al. |
| 2021/0292152 A1 | 9/2021 | Fedorka et al. |
| 2021/0307564 A1 | 10/2021 | Gort-Barten |
| 2021/0309422 A1 | 10/2021 | Hiltser et al. |
| 2021/0316913 A1 | 10/2021 | Woody et al. |
| 2021/0316979 A1 | 10/2021 | Hayes-pankhurst et al. |
| 2021/0317393 A1 | 10/2021 | Peirsman et al. |
| 2021/0338004 A1 | 11/2021 | Alsayar et al. |
| 2021/0347623 A1* | 11/2021 | Fantappie ............ B67D 1/0042 |
| 2021/0354883 A1 | 11/2021 | Ferrari et al. |
| 2021/0361112 A1 | 11/2021 | Hobden et al. |
| 2021/0362993 A1 | 11/2021 | Shafir et al. |
| 2021/0378267 A1 | 12/2021 | Barak |
| 2021/0380392 A1 | 12/2021 | Glucksman et al. |
| 2022/0002134 A1 | 1/2022 | Pellaud |
| 2022/0022496 A1 | 1/2022 | Monsanto et al. |
| 2022/0024748 A1 | 1/2022 | Fantappie et al. |
| 2022/0031110 A1 | 2/2022 | Sekulic et al. |
| 2022/0031113 A1 | 2/2022 | Smith et al. |
| 2022/0033172 A1 | 2/2022 | Favre |
| 2022/0039587 A1 | 2/2022 | De Freitas |
| 2022/0039602 A1 | 2/2022 | Xiong |
| 2022/0040651 A1 | 2/2022 | Böttcher et al. |
| 2022/0053967 A1 | 2/2022 | Guyon et al. |
| 2022/0061581 A1 | 3/2022 | Fernandes De Carvalho et al. |
| 2022/0071435 A1 | 3/2022 | Tseng |
| 2022/0071437 A1 | 3/2022 | Tseng |
| 2022/0071440 A1 | 3/2022 | Tseng et al. |
| 2022/0071441 A1 | 3/2022 | Patil et al. |
| 2022/0073238 A1 | 3/2022 | Naumann et al. |
| 2022/0073336 A1* | 3/2022 | Savioz ................ B67D 1/0047 |
| 2022/0088937 A1 | 3/2022 | Oya |
| 2022/0098020 A1 | 3/2022 | Garcia Tebar |
| 2022/0106180 A1 | 4/2022 | Rue et al. |
| 2022/0135294 A1 | 5/2022 | Peng et al. |
| 2022/0169424 A1 | 6/2022 | Yang |
| 2022/0289548 A1 | 9/2022 | Augsburger |
| 2022/0296015 A1 | 9/2022 | Crane |

FOREIGN PATENT DOCUMENTS

| | | |
|---|---|---|
| AU | 2013284311 B2 | 12/2016 |
| AU | 2014241782 B2 | 9/2017 |
| AU | 2016259900 A1 | 11/2017 |
| AU | 2016200626 B2 | 3/2018 |
| AU | 2018201199 B2 | 11/2018 |
| AU | 2017394249 A1 | 7/2019 |
| AU | 2019238313 A1 | 11/2020 |
| BR | 112014032633 B1 | 4/2020 |
| BR | 112021003593 A2 | 5/2021 |
| CA | 3081923 A1 | 2/2013 |
| CA | 2903862 A1 | 9/2014 |
| CA | 2904325 A1 | 9/2014 |
| CA | 2920909 A1 | 2/2015 |
| CA | 2961901 A1 | 4/2016 |
| CA | 2967927 A1 | 5/2016 |
| CA | 2977475 A1 | 9/2016 |
| CA | 2983958 A1 | 11/2016 |
| CA | 2996900 A1 | 3/2017 |
| CA | 2781759 C | 9/2017 |
| CA | 2837286 C | 11/2017 |
| CA | 2837064 C | 1/2018 |
| CA | 3041722 A1 | 5/2018 |
| CA | 3047084 A1 | 6/2018 |
| CA | 3049841 A1 | 7/2018 |
| CA | 3079433 A1 | 4/2019 |
| CA | 3095669 A1 | 9/2019 |
| CA | 2936866 C | 10/2019 |
| CA | 2875899 C | 12/2019 |
| CA | 2843702 C | 7/2020 |
| CA | 3081920 C | 9/2021 |
| CN | 1016312 B | 4/1992 |
| CN | 201200323 Y | 3/2009 |
| CN | 101432221 B | 8/2012 |
| CN | 101300190 B | 2/2013 |
| CN | 103213928 A | 7/2013 |
| CN | 203314745 U | 12/2013 |
| CN | 203576299 U | 5/2014 |
| CN | 102842181 B | 1/2015 |
| CN | 104654699 A | 5/2015 |
| CN | 104828373 A | 8/2015 |
| CN | 105000258 A | 10/2015 |
| CN | 103720363 B | 11/2015 |
| CN | 105377408 A | 3/2016 |
| CN | 103648963 B | 4/2016 |
| CN | 103213928 B | 5/2016 |
| CN | 105595868 A | 5/2016 |
| CN | 103647800 B | 8/2016 |
| CN | 103781538 B | 9/2016 |
| CN | 103663329 B | 4/2017 |
| CN | 103430117 B | 5/2017 |
| CN | 105307973 B | 9/2017 |
| CN | 103841862 B | 10/2017 |
| CN | 102712453 B | 11/2017 |
| CN | 105188897 B | 11/2017 |
| CN | 107530653 A | 1/2018 |
| CN | 108024654 A | 5/2018 |
| CN | 105712278 B | 8/2018 |
| CN | 208291834 U | 12/2018 |
| CN | 109171502 A | 1/2019 |
| CN | 109380973 A | 2/2019 |
| CN | 109922668 A | 6/2019 |
| CN | 104582509 B | 7/2019 |
| CN | 106715322 B | 8/2019 |
| CN | 105849030 B | 9/2019 |
| CN | 110198910 A | 9/2019 |
| CN | 110234592 A | 9/2019 |

(56) References Cited

FOREIGN PATENT DOCUMENTS

| | | |
|---|---|---|
| CN | 110247484 A | 9/2019 |
| CN | 106073500 B | 10/2019 |
| CN | 107108192 B | 10/2019 |
| CN | 107074522 B | 1/2020 |
| CN | 209988362 U | 1/2020 |
| CN | 107108191 B | 2/2020 |
| CN | 107438580 B | 3/2020 |
| CN | 105011305 B | 5/2020 |
| CN | 111356648 A | 6/2020 |
| CN | 108910815 B | 7/2020 |
| CN | 111386060 A | 7/2020 |
| CN | 111466793 A | 7/2020 |
| CN | 106793808 B | 8/2020 |
| CN | 111589315 A | 8/2020 |
| CN | 112218819 A | 1/2021 |
| CN | 112421819 A | 2/2021 |
| CN | 112998522 A | 6/2021 |
| CN | 113038840 A | 6/2021 |
| CN | 107205445 B | 7/2021 |
| CN | 113165861 A | 7/2021 |
| CN | 113226052 A | 8/2021 |
| CN | 108768070 B | 9/2021 |
| CN | 214731066 U | 11/2021 |
| CN | 110980621 B | 1/2022 |
| CN | 113905975 A | 1/2022 |
| CN | 109863112 B | 2/2022 |
| CN | 113995076 A | 2/2022 |
| CN | 112313168 B | 10/2022 |
| DE | 202015104155 U1 | 11/2015 |
| EP | 0268451 | 5/1988 |
| EP | 1351758 A1 | 10/2003 |
| EP | 1767262 B1 | 8/2008 |
| EP | 1718403 B1 | 5/2011 |
| EP | 2340754 A1 | 7/2011 |
| EP | 2359260 A1 | 8/2011 |
| EP | 2340754 B1 | 10/2012 |
| EP | 2504270 A1 | 10/2012 |
| EP | 2504271 A1 | 10/2012 |
| EP | 1966065 B2 | 11/2012 |
| EP | 2714577 A1 | 4/2014 |
| EP | 2737834 A1 | 6/2014 |
| EP | 2969899 A2 | 1/2016 |
| EP | 2714577 B1 | 7/2016 |
| EP | 2719450 B1 | 7/2016 |
| EP | 2504270 B1 | 11/2016 |
| EP | 3003542 A4 | 1/2017 |
| EP | 3021686 A4 | 2/2017 |
| EP | 2359260 B1 | 6/2017 |
| EP | 3197820 A2 | 8/2017 |
| EP | 2976975 B1 | 1/2018 |
| EP | 3261981 A1 | 1/2018 |
| EP | 3212562 A4 | 6/2018 |
| EP | 2741845 B1 | 8/2018 |
| EP | 3294443 A4 | 1/2019 |
| EP | 3040114 B1 | 3/2019 |
| EP | 3275345 B1 | 3/2019 |
| EP | 3349622 A4 | 6/2019 |
| EP | 3221251 B1 | 10/2019 |
| EP | 3533937 A3 | 11/2019 |
| EP | 3452403 A4 | 1/2020 |
| EP | 2504271 B1 | 4/2020 |
| EP | 3537891 A4 | 5/2020 |
| EP | 3554988 A4 | 7/2020 |
| EP | 2866593 B1 | 8/2020 |
| EP | 3643676 A3 | 8/2020 |
| EP | 3697724 A1 | 8/2020 |
| EP | 2714578 B1 | 12/2020 |
| EP | 3760795 A1 | 1/2021 |
| EP | 3762331 A1 | 1/2021 |
| EP | 3200610 B1 | 2/2021 |
| EP | 3571152 A4 | 3/2021 |
| EP | 3834622 A1 | 6/2021 |
| EP | 3212563 B1 | 9/2021 |
| EP | 3869973 A1 | 9/2021 |
| EP | 3870535 A1 | 9/2021 |
| EP | 3871994 A1 | 9/2021 |
| EP | 3877322 A1 | 9/2021 |
| EP | 3883389 A1 | 9/2021 |
| EP | 3768629 A4 | 12/2021 |
| EP | 3808230 B1 | 6/2022 |
| EP | 4069626 A1 | 10/2022 |
| ES | 2351796 T3 | 2/2011 |
| ES | 2532901 T3 | 4/2015 |
| ES | 2749388 T3 | 3/2020 |
| FR | 2623488 A1 | 5/1989 |
| FR | 3041614 A1 | 3/2017 |
| FR | 3078531 B1 | 5/2021 |
| GB | 2259653 A | 3/1993 |
| GB | 2486872 A | 7/2012 |
| GB | 2526734 A | 12/2015 |
| GB | 2486872 B | 3/2016 |
| IL | 119044 | 11/1996 |
| RU | 2491875 C2 | 9/2013 |
| WO | 8503853 A1 | 9/1985 |
| WO | 8907575 A1 | 8/1989 |
| WO | 9807122 A1 | 2/1998 |
| WO | 0103817 A1 | 1/2001 |
| WO | 03083431 A2 | 10/2003 |
| WO | 03098776 A1 | 11/2003 |
| WO | 2004063087 A1 | 7/2004 |
| WO | 2008101275 A1 | 8/2008 |
| WO | 2009027053 A1 | 3/2009 |
| WO | 2009135758 A1 | 11/2009 |
| WO | 2009136781 A1 | 11/2009 |
| WO | 2012025425 A1 | 3/2012 |
| WO | 2012082712 A1 | 6/2012 |
| WO | 2013019963 A2 | 2/2013 |
| WO | 2013036564 A2 | 3/2013 |
| WO | 2013019963 A3 | 5/2013 |
| WO | 2014037456 A1 | 3/2014 |
| WO | 2014182423 A2 | 11/2014 |
| WO | 2014182423 A3 | 12/2014 |
| WO | 2014201753 A1 | 12/2014 |
| WO | 2015123612 A1 | 8/2015 |
| WO | 2016073069 A1 | 5/2016 |
| WO | 2016087474 A1 | 6/2016 |
| WO | 2016202815 A1 | 12/2016 |
| WO | 2017096505 A1 | 6/2017 |
| WO | 2017109718 A1 | 6/2017 |
| WO | WO-2018210558 A1 * | 11/2018 |
| WO | 2019183540 A1 | 9/2019 |
| WO | 2020084615 A1 | 4/2020 |
| WO | 2020086425 A1 | 4/2020 |
| WO | 2020092859 A1 | 5/2020 |
| WO | 2020097558 A1 | 5/2020 |
| WO | 2020097728 A1 | 5/2020 |
| WO | 2020092859 A8 | 6/2020 |
| WO | 2020148294 A1 | 7/2020 |
| WO | 2020148293 A3 | 9/2020 |
| WO | 2020174336 A1 | 9/2020 |
| WO | 2020193376 A1 | 10/2020 |
| WO | 2020198811 A1 | 10/2020 |
| WO | 2020219385 A1 | 10/2020 |
| WO | 2020234060 A1 | 11/2020 |
| WO | 2020243452 A1 | 12/2020 |
| WO | 2021016331 A1 | 1/2021 |
| WO | 2021016343 A1 | 1/2021 |
| WO | 2021018760 A1 | 2/2021 |
| WO | 2021019161 A1 | 2/2021 |
| WO | 2021028654 A2 | 2/2021 |
| WO | 2021032892 A1 | 2/2021 |
| WO | 2021055937 A1 | 3/2021 |
| WO | 2021061553 A1 | 4/2021 |
| WO | 2021061614 A1 | 4/2021 |
| WO | 2021090186 A1 | 5/2021 |
| WO | 2021093936 A1 | 5/2021 |
| WO | 2021101990 A1 | 5/2021 |
| WO | 2021115135 A1 | 6/2021 |
| WO | 2021138385 A1 | 7/2021 |
| WO | 2021140254 A1 | 7/2021 |
| WO | 2021168069 A1 | 8/2021 |
| WO | 2021174309 A1 | 9/2021 |
| WO | 2021191774 A1 | 9/2021 |
| WO | 2021198162 A1 | 10/2021 |

(56) References Cited

FOREIGN PATENT DOCUMENTS

| WO | 2021209507 A1 | 10/2021 |
| WO | 2021228877 A1 | 11/2021 |
| WO | 2021233931 A1 | 11/2021 |
| WO | 2021240307 A1 | 12/2021 |
| WO | 2021240308 A1 | 12/2021 |
| WO | 2021240311 A1 | 12/2021 |
| WO | 2022020764 A1 | 1/2022 |
| WO | 2022038408 A1 | 2/2022 |
| WO | 2022051389 A1 | 3/2022 |
| WO | 2022126811 A1 | 6/2022 |
| WO | 2022189622 A1 | 9/2022 |
| WO | 2022189623 A1 | 9/2022 |

OTHER PUBLICATIONS

U.S. Appl. No. 18/362,513, filed Jul. 31, 2023, Ingredient Container Valve Control.
U.S. Appl. No. 18/649,462, filed Apr. 29, 2024, Ingredient Container.
U.S. Appl. No. 18/124,715, filed Mar. 22, 2023, Additive Container With Inlet Tube.
U.S. Appl. No. 18/124,905, filed Mar. 22, 2023, Additive Container With Bottom Cover.
U.S. Appl. No. 18/124,765, filed Mar. 22, 2023, Adapter for Beverage Dispenser.
U.S. Appl. No. 18/208,863, filed Jun. 12, 2023, Adapter for Beverage Dispenser.
U.S. Appl. No. 18/537,422, filed Dec. 12, 2023, Additive Container With Bottom Cover.
U.S. Appl. No. 18/170,993, filed Feb. 17, 2023, Ingredient Container Valve Control.
European Search Report received for European Patent Application No. 23209898.8, mailed on Apr. 23, 2024, 4 pages.
Invitation to Pay Additional Fees received for PCT Application No. PCT/US2023/078826, mailed on Mar. 12, 2024, 10 pages.
International Search Report and Written Opinion received for PCT Application No. PCT/US2023/078826, mailed on Jul. 4, 2024, 23 pages.
Invitation to Pay Additional Fees received for PCT Application No. PCT/US2024/016898, mailed on Jul. 1, 2024, 11 pages.
U.S. Appl. No. 17/744,459, filed May 13, 2022, Flavored beverage carbonation system.
U.S. Appl. No. 17/744,462, filed May 13, 2022, Flavorant for beverage carbonation system.
U.S. Appl. No. 17/744,468, filed May 13, 2022, Flavored beverage carbonation process.
U.S. Appl. No. 17/811,177, filed Jul. 7, 2022, Flavored beverage carbonation system.
U.S. Appl. No. 17/989,640, filed Nov. 17, 2022, Ingredient containers for use with beverage dispensers.
U.S. Appl. No. 17/989,636, filed Nov. 17, 2022, Ingredient container with sealing valve.
U.S. Appl. No. 17/989,642, filed Nov. 17, 2022, Dosing accuracy.
U.S. Appl. No. 17/989,610, filed Nov. 17, 2022, Ingredient container.
U.S. Appl. No. 17/989,648, filed Nov. 17, 2022, Ingredient container with retention features.
U.S. Appl. No. 17/989,657, filed Nov. 17, 2022, Ingredient container with valve control.

* cited by examiner

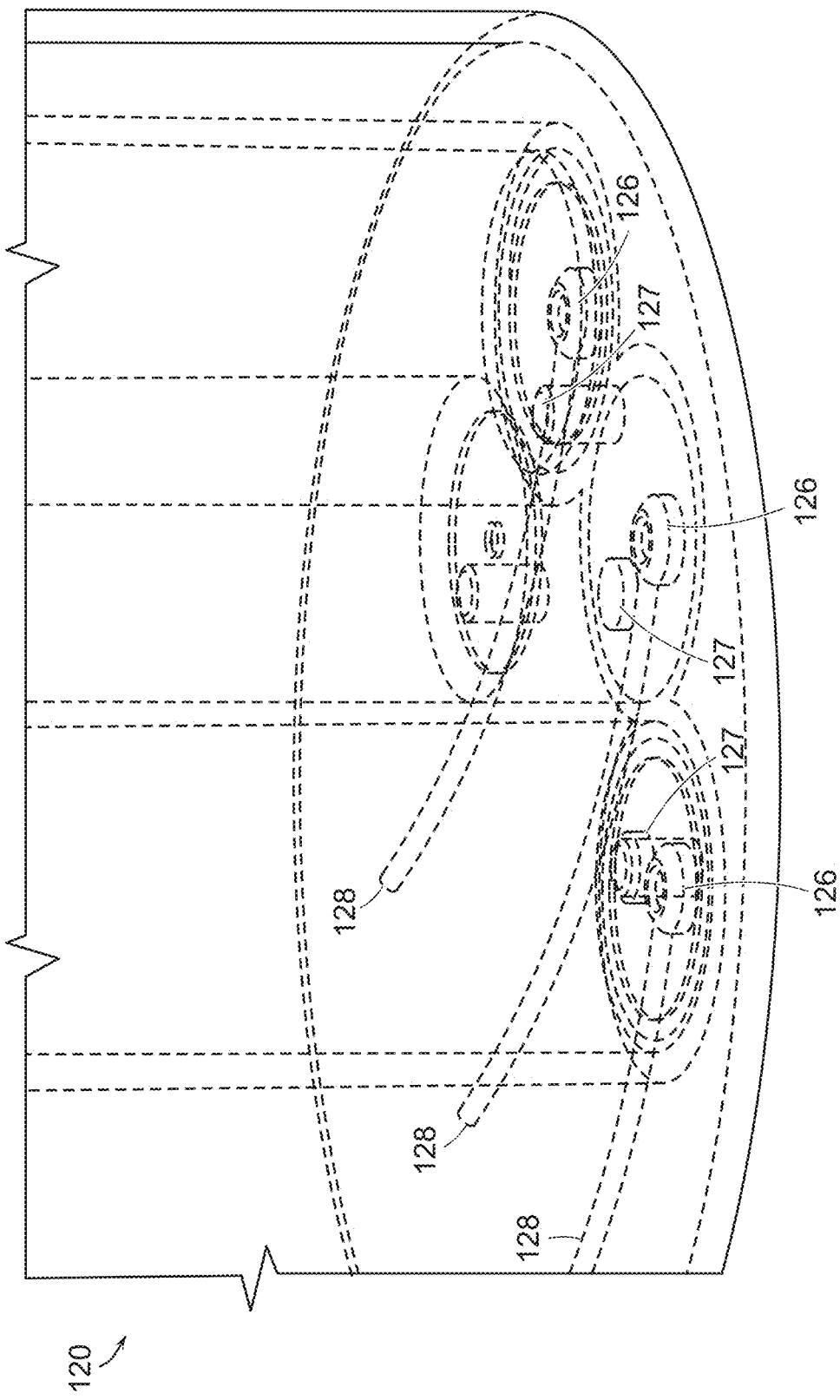

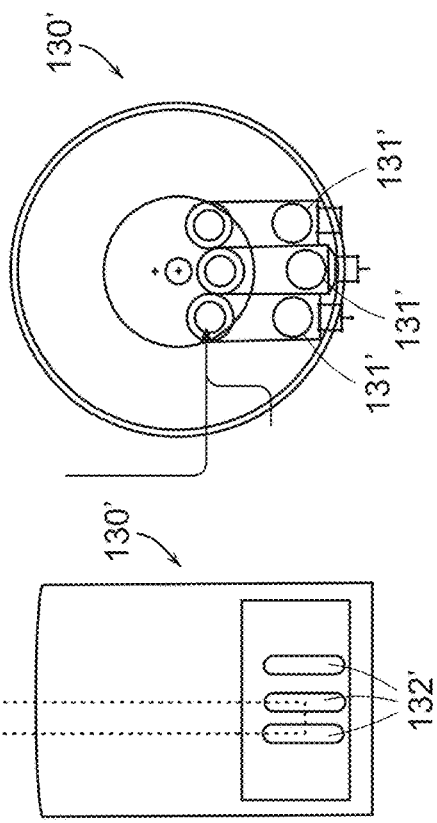
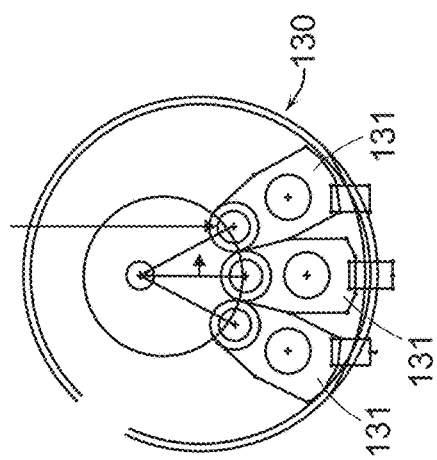
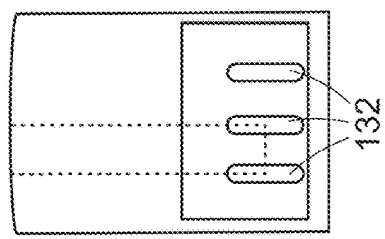

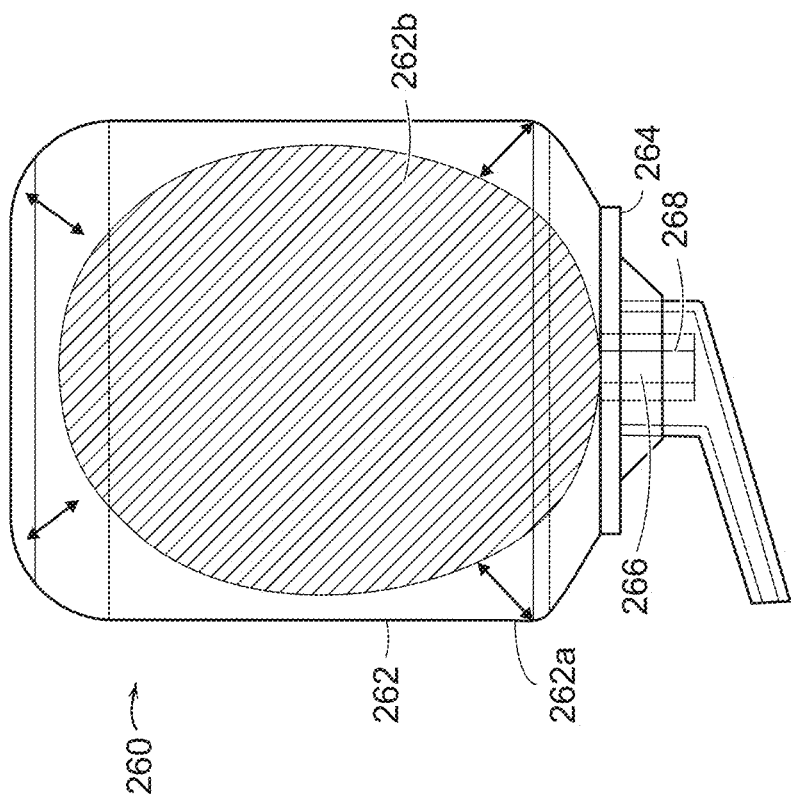
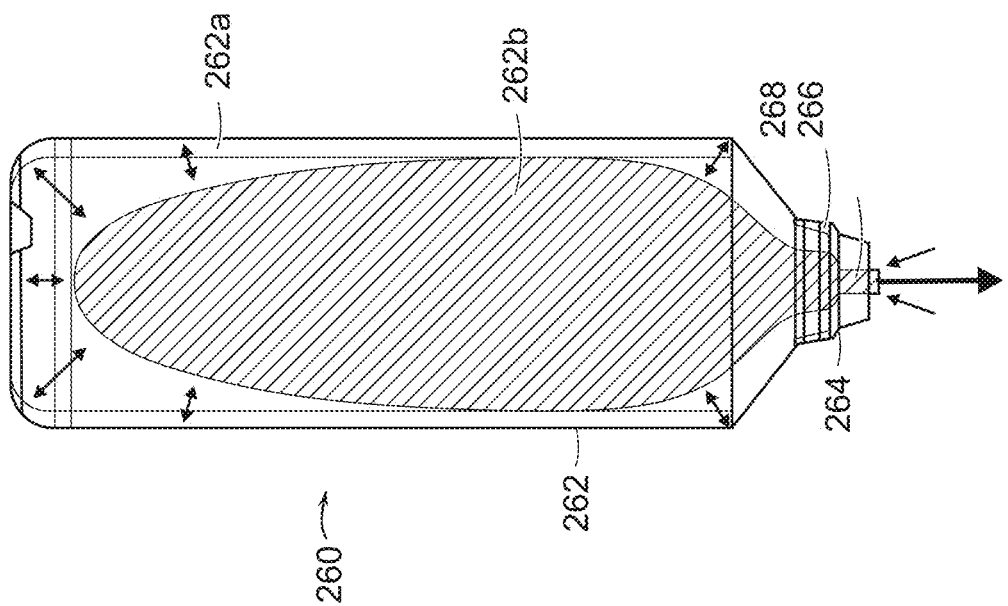
FIG. 12B
FIG. 12A

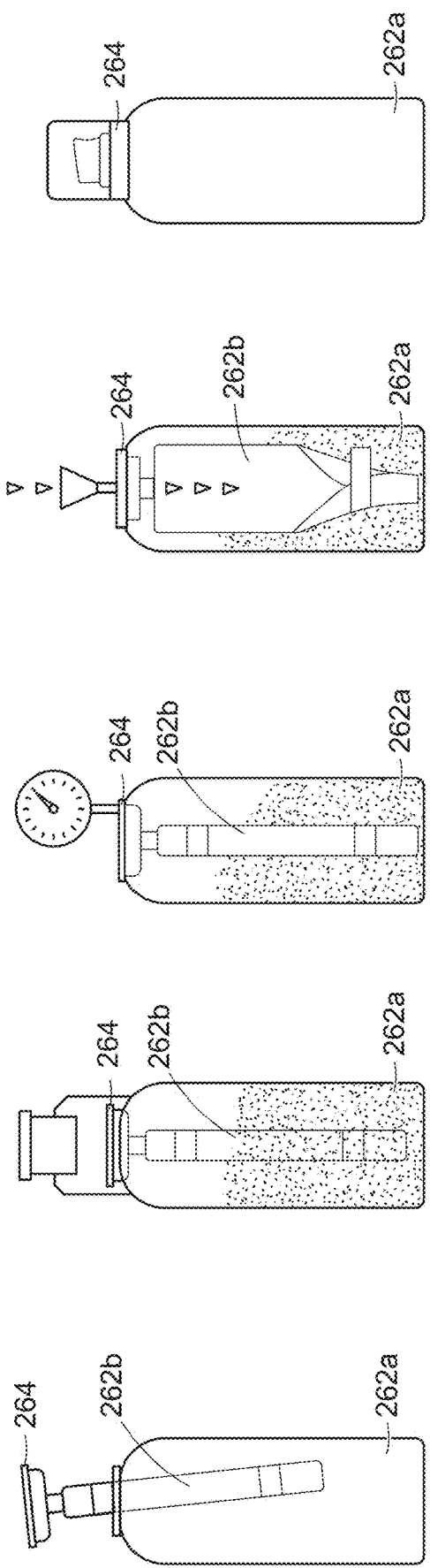

ADDITIVE CONTAINERS

FIELD

Beverage dispensing systems, components, and additive containers for use with beverage dispensing systems are provided.

BACKGROUND

Conventional beverage dispensing devices operate to carbonate and/or flavor water. Some devices may mix carbonated water and a flavoring compound together in a machine and then dispense the resulting mixture into a receptacle. Unless the devices are thoroughly cleaned, this method can result in contamination occurring over time. Other devices rely on crushing, puncturing, and/or generally compromising flavoring containers in order to access the flavoring compounds inside. These methods of breaching flavoring containers can result in splatter and mess, which, if not thoroughly cleaned, can result in similar contamination.

Still other devices rely on carbonating water within a specialized container to be attached to the device, and from which the resulting beverage is served. The container can be pre-filled with water and/or flavoring, and then it can be secured to the devices and pressurized within the container and used to serve the resulting beverage. These devices require specially adapted bottles that interface with the device.

Accordingly, there remains a need for improved methods and devices for preparing beverages.

SUMMARY

Various beverage dispensing system and additive containers for use with beverage dispensing systems are provided.

In one embodiment, a dispensing system is provided. The dispensing system can include a housing, a carbonation assembly disposed within the housing, and a drawer slidably mounted to the housing. The carbonation assembly can be configured to selectively carbonate a fluid, and the drawer can be configured to seat at least one additive container. The dispensing system can be configured to selectively dispense an additive contained within an additive container in the drawer from a first outlet and can dispense a fluid from a second outlet separate from the first outlet.

One or more of the following features can be included in any feasible combination. For example, the drawer can be slidably movable horizontally between an open position in which an additive container can be top-loaded into the drawer and a closed position in which the drawer is fully disposed within the housing. In another example, the drawer can be configured to seat a plurality of additive containers. In certain aspects, the drawer can be configured to seat a plurality of additive containers in one of a radial formation and a linear formation. In other aspects, the second outlet can be centrally disposed, and the drawer can be configured to seat the plurality of additive containers peripherally of the first outlet.

In another example, the dispensing system can be configured to selectively introduce at least one gas into an additive container seated in the drawer to cause the additive container to dispense the additive from the first outlet. In certain aspects, the drawer can include at least one inlet port fluidly coupled to a pump. The pump can be configured to selectively introduce the at least one gas into an additive container.

In another example, the drawer can include at least one viewing window configured to enable viewing of an additive container in the drawer when the drawer is in a closed position.

In another embodiment, a dispensing system is provided. The dispensing system can include a housing, a carbonation assembly at least partially contained within the housing, and a top-loading carriage assembly coupled to the housing. The carbonation assembly can be configured to selectively carbonate a fluid. The top-loading carriage assembly can be configured to receive at least one additive container. The dispensing system can be configured to dispense an additive disposed within an additive container in the carriage assembly to dispense a fluid that is selectively carbonated by the carbonation assembly into a receptacle.

One or more of the following features can be included in any feasible combination. For example, the top-loading carriage assembly can include an inlet port fluidly coupled to at least one air pump and can be configured to selectively introduce at least one gas into an additive container in the carriage assembly to cause the additive container to dispense an additive. In certain embodiments, the top-loading carriage assembly can include a lid movable between an open position and a closed position. The lid, in the closed position, can be configured to apply a force to an additive container in the carriage assembly to couple an inlet port in the additive container with an outlet port in the housing.

In another example, the top-loading carriage assembly can include a plurality of isolated silos. Each of the isolated silos can be configured to seat an additive container. In certain aspects, each of the isolated silos can include an inlet port and an outlet port. Each of the inlet ports can be configured to allow at least one gas to be introduced into an additive container in the silo to cause the additive container to dispense an additive from the respective outlet port. In other aspects, each of the isolated silos can be independently pressurizable to cause an additive container therein to compress and dispense an additive.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which:

FIG. 5C is a partially-transparent side perspective view of the carriage assembly of FIG. 5A;

FIG. 6A is a front view of a carriage assembly having a plurality of viewing windows according to another embodiment;

FIG. 6B is a top view of the carriage assembly of FIG. 6A containing several additive containers disposed in a radial formation;

FIG. 6C is a front view of another embodiment of a carriage assembly having a plurality of viewing windows;

FIG. 6D is a top view of the carriage assembly of FIG. 6C containing several additive containers disposed in a linear formation;

FIG. 12A is a side view of an embodiment of an additive container having a bag-on-valve design according to an embodiment;

FIG. 12B is a side view of an additive container having a bag-on-valve design and an extended spout according to another embodiment;

FIG. 12C is a side view of an additive container, showing an illustrative process of preparing an additive container having a bag-on-valve design involving placing a valve and bag inside a container;

FIG. 12D is a side view of the additive container of FIG. 12C, showing a step involving crimping and gassing procedures;

FIG. 12E is a side view of the additive container of FIG. 12C, showing another step involving a pressure control procedure;

FIG. 12F is a side view of the additive container of FIG. 12C, showing another step involving a product filling and weight control procedure;

FIG. 12G is a side view of the additive container of FIG. 12C, showing another step involving an actuator and cap placement procedure;

Figure 1:
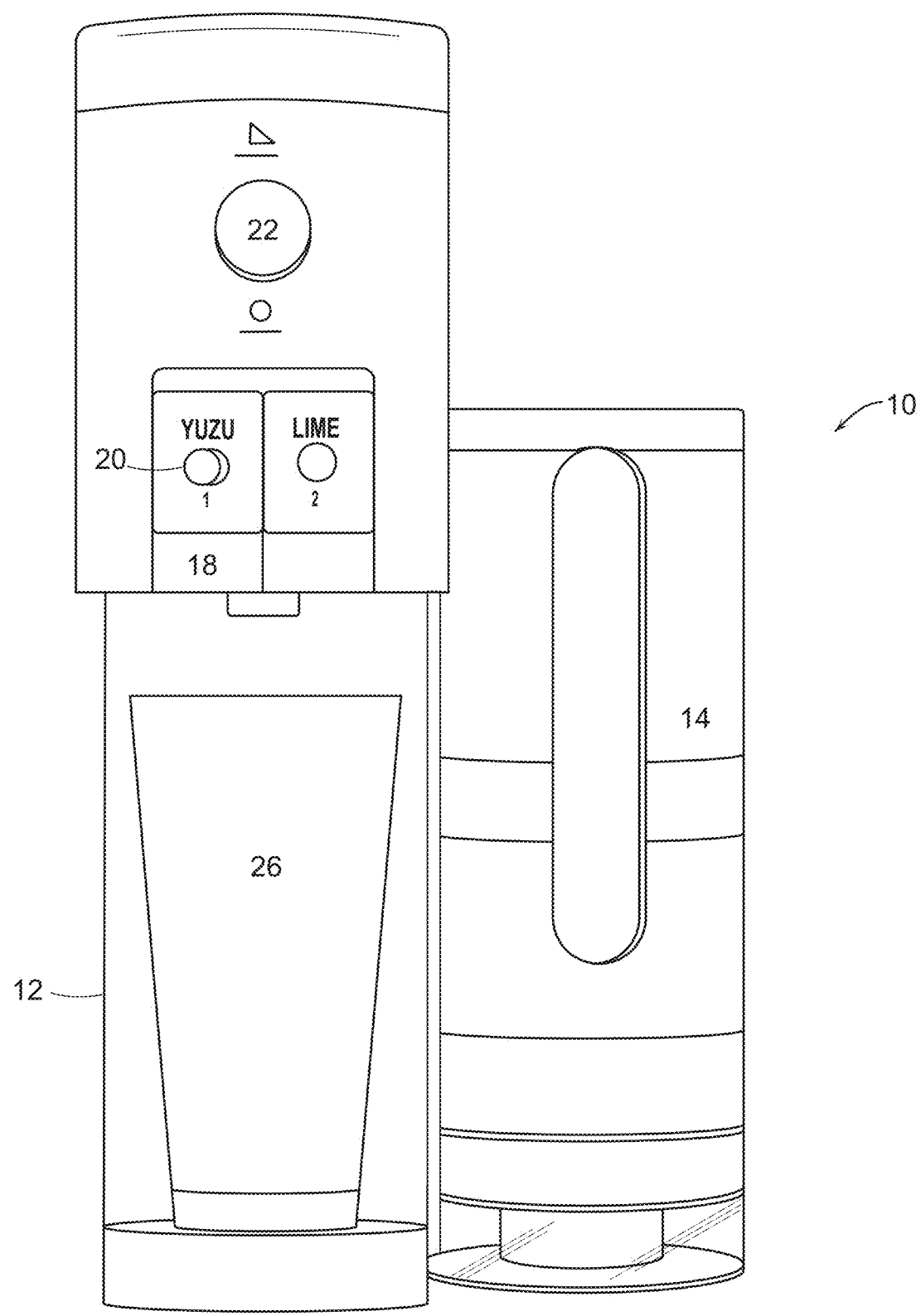
FIG. 1 is a front view of one embodiment of a beverage dispensing system.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain illustrative embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting illustrative embodiments and that the scope of the present invention is defined solely by the claims. The features illustrated or described in connection with one illustrative embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various additive containers for use with beverage dispensing systems are provided. In general, the additive container can contain any additive, such as a flavorant, vitamin, or other substance to be added to a beverage or other liquid food supply, for use in a beverage dispensing process. The additive container can have a hollow container body with a cap or other closure coupled to or formed on the container body. The cap can include a fluid outlet therein. In some embodiments, the cap can further include a cover configured to selectively close the fluid outlet, thereby sealing a hollow interior of the container body. The additive container can be configured to be received in a beverage dispensing device. In certain illustrative embodiments, the beverage dispensing device can include a carriage for receiving the additive. Accordingly, various embodiments of carriages are also provided herein. The carriage can have complimentary features to receive and retain the additive container, and when retained, the additive container can be employed by the beverage dispensing device for use in the creation of customized beverages.

Methods of dispensing the additive stored within the additive container can vary. In some embodiments, the additive container can be pressurized with gas via a fluid inlet in the cap to cause the fluid outlet to open and dispense the stored additive. When the additive container is properly seated and retained by a carriage, a gas line fluidly coupled to a pump can receive the fluid inlet of the additive container in order to seal around the inlet in preparation for the introduction of gas into the additive container during a dispensing procedure. Once a customized beverage is created using an additive stored within the additive container, gas can be pumped by the pump, though the gas line, through an inlet seal in the fluid inlet, and into the hollow interior of the additive container. The resulting increase in internal pressure can cause an outlet seal in the fluid outlet to open and dispense an amount of the additive proportional to the amount of air introduced through the inlet. Other techniques for ejecting fluid from an additive container are also provided.

Figure 2:
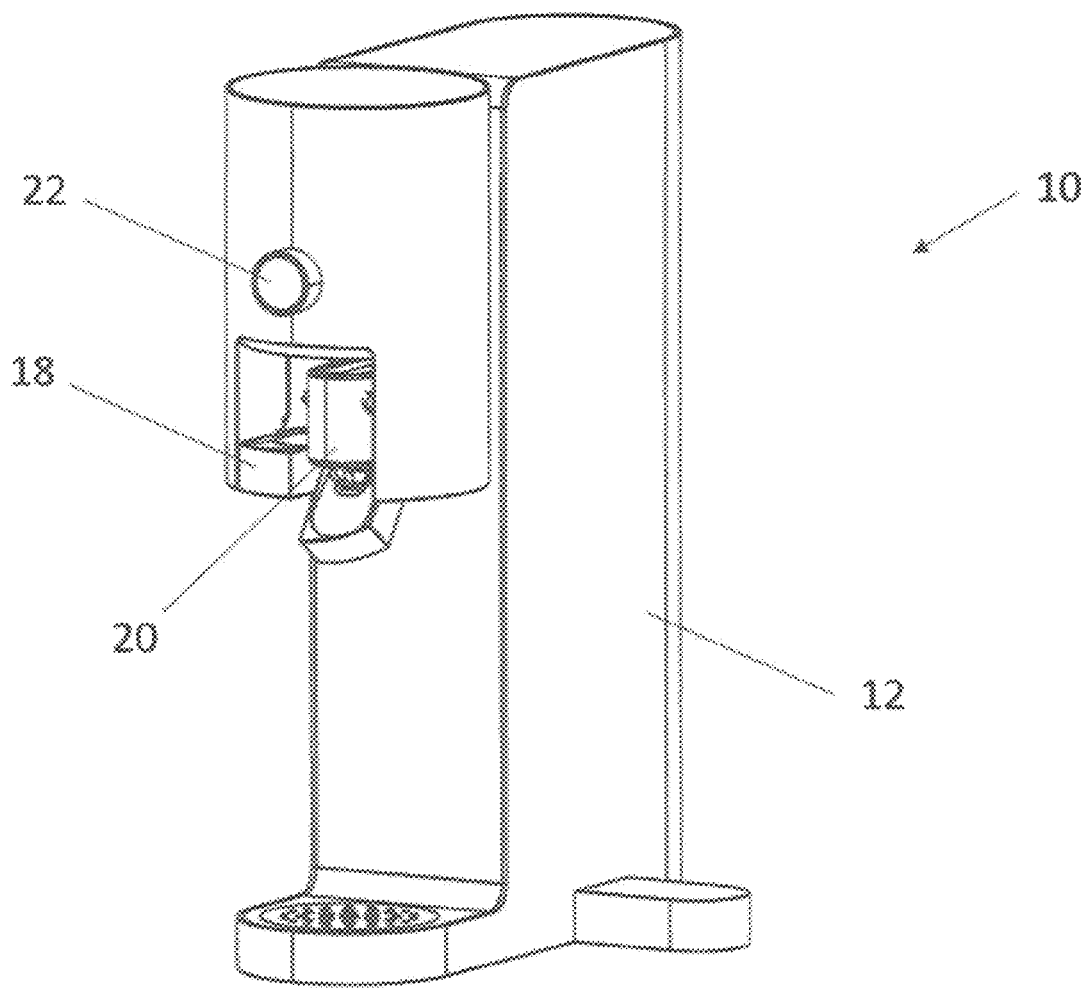
FIG. 2 is a side perspective view of the beverage dispensing system of FIG. 1.
Figure 3:
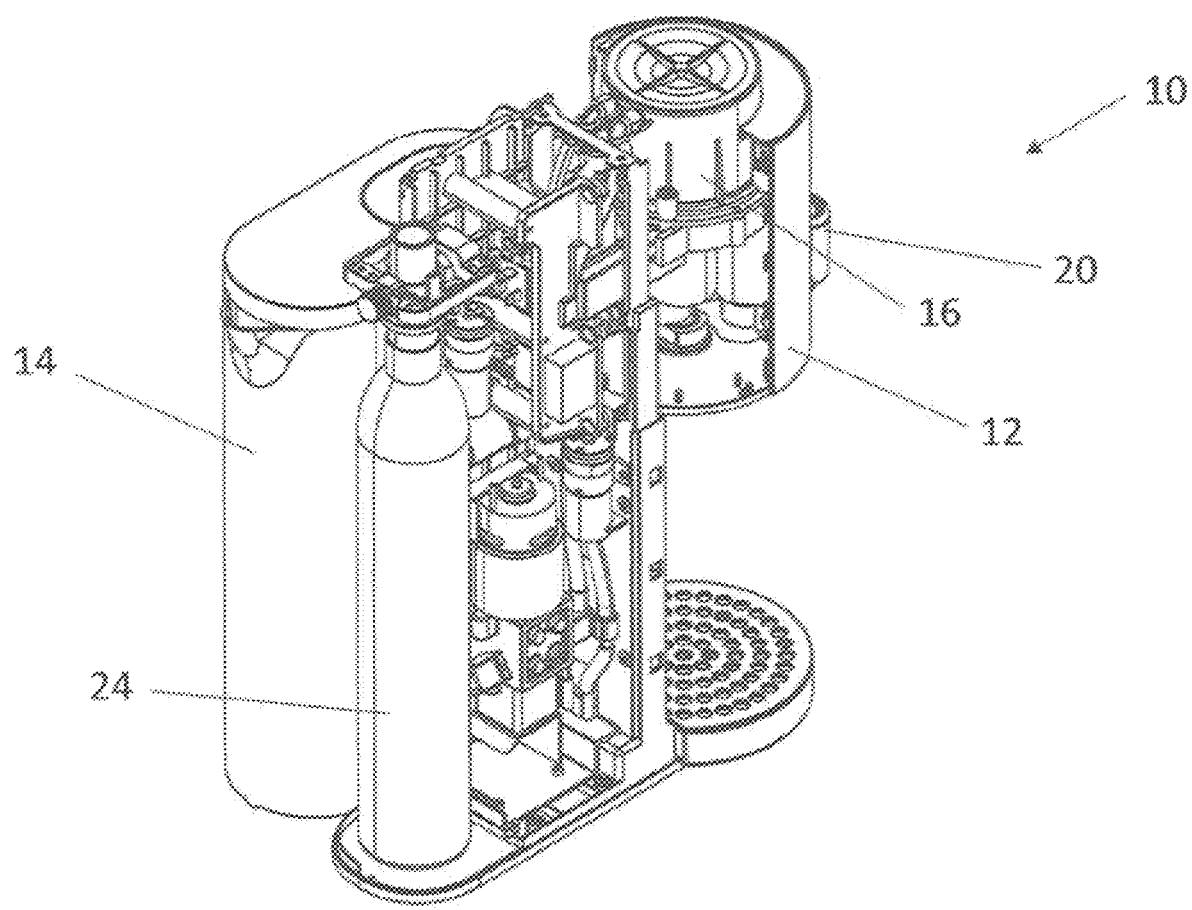
FIG. 3 is a rear perspective view of the beverage dispensing system of FIG. 1, having various housing elements removed.

FIGS. 1-3 illustrate one illustrative embodiment of a beverage dispensing system 10. The beverage dispensing system 10 can be used to create and dispense customized beverages for a user, based on desired characteristics of the beverage. The illustrated beverage dispensing system 10 generally includes a housing 12 having a fluid reservoir 14 and a carbonation assembly 16. In certain embodiments, the fluid reservoir 14 can be coupled to the housing 10 in a removable manner, such as in the form of a water tank, pitcher, and the like. Such a configuration can allow the reservoir to be stored in a refrigerator when not in use, thus allowing for the use of chilled fluid during the carbonation process. The carbonation assembly 16 can use liquid, e.g., water, contained in the fluid reservoir and mix it with carbon-dioxide in order to carbonate the liquid. The carbon-dioxide can be sourced from a canister 24, or it may come from another source, such as from a chemical process to generate carbon-dioxide, or any other source.

The carbonation assembly 16 is configured to mix a liquid with $CO_2$ to form a treated fluid in the form of a carbonated fluid intended to be a beverage. A carbonation assembly is one example of a treatment assembly of a beverage dispensing system. Other treatment assemblies can be used with the beverage dispensing systems described herein. Treatment assemblies that do not use $CO_2$ are generally configured and used similar to the carbonation assemblies described herein except instead of mixing $CO_2$ with a liquid, a different gas is mixed with the liquid. The resulting fluid is a treated fluid but is not a "carbonated" fluid.

A carriage assembly 18 can be coupled to the beverage dispensing system 10, and it can receive one or more additive containers 20 to be used in the creation of beverages. The carriage assembly 18 can be located anywhere on or in the beverage dispensing system 10, and it can be fixedly, movably, or removably coupled thereto.

The additive containers 20 can contain one or more additives to be mixed into a beverage dispensed by the beverage dispensing system 10, as indicated above. The one or more additives can be mixed in the beverage dispensing system 10, or they can be dispensed from the beverage dispensing system 10 separately and mixed in a drinking container 26, e.g., a cup, a bottle, etc. The one or more additives contained in an additive container 20 can take any physical form, such as a solid, liquid, or gas, or a compound thereof, and the additive can be a flavorant, a color or dye, a vitamin, supplement, or any other type of ingredient or compound to be added to a beverage. In general, the additive container 20 can include a cap coupled to a container. The cap can include at least one valve thereon to permit the outflow of the additive.

To dispense a beverage, in an illustrative process, a user can first ensure that the beverage dispensing system 10 is properly set up. This set up process can include filling the fluid reservoir, connecting, prepping, or priming a carbon-dioxide source, e.g., canister 24, and then loading one or more additive containers 20 into the carriage assembly 16.

Once the beverage dispensing system is set up, a user can actuate inputs located at a user interface 22 in order to select specific characteristics of their desired beverage. These characteristics can include volume, carbonation level, and additive type (i.e., if one or more additive containers 20 is retained in the carriage assembly 18), and additive amount. If the user selects inputs to indicate that the beverage is carbonated, water can be fed from the fluid reservoir 14 and into the carbonation assembly 16, and carbon-dioxide can be fed from the canister 24, for example, and into the carbonation assembly 16 to produce carbonated water. If the user selects inputs to indicate that the additive should be added to the beverage, the beverage dispensing system 10 can dispense the additive from the one or more additive containers 20 coupled to the system. The beverage can be dispensed into a container, such as a drinking glass 26, or equivalent such as a travel mug, bottle, jar, mug, etc.

The specific details related to set up, characteristic selection at a user interface, and beverage creation can vary, depend upon the specific layout of the beverage dispensing device 10. For example, in embodiments that do not rely on carbon-dioxide, and instead rely on a different gas (e.g., nitrogen), the above-described steps related to carbon-dioxide and carbonation can be adjusted or omitted as necessary.

Illustrative embodiments of beverage dispensing systems are disclosed in more detail, for example, in U.S. patent application Ser. No. 17/744,459, filed on May 13, 2022, and entitled "FLAVORED BEVERAGE CARBONATION SYSTEM," which is incorporated by reference herein in its entirety.

In various embodiments, as introduced, the specific layout of the carriage assembly can vary. FIGS. 4A-6E illustrate various embodiments of carriage assemblies and features thereof.

Figure 4A:
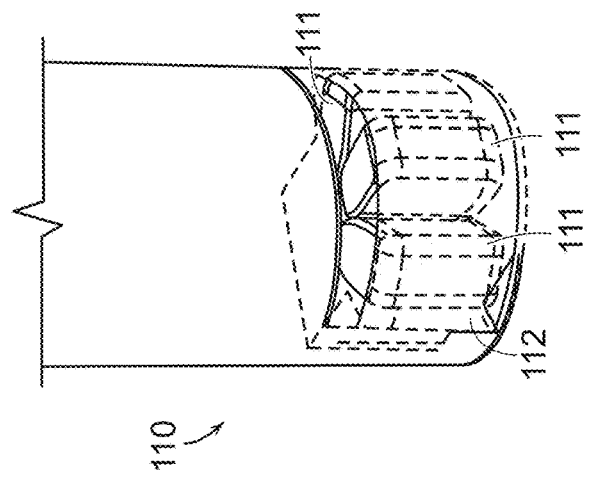
FIG. 4A is a side perspective view of one embodiment of a carriage assembly for use in a beverage dispensing system.
Figure 4B:
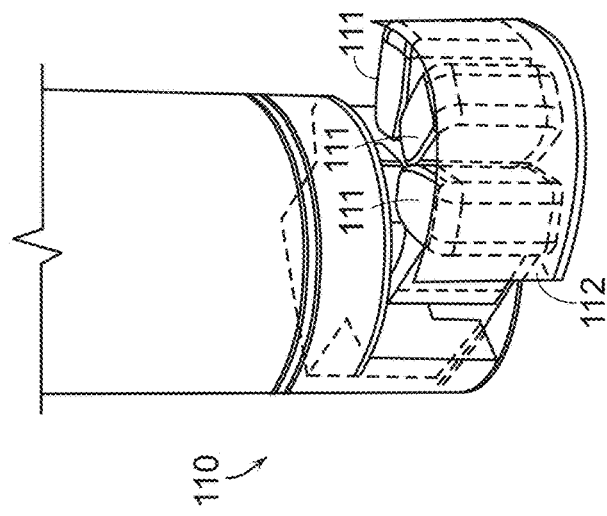
FIG. 4B is a side perspective view of the carriage assembly of FIG. 4A in an open configuration.
Figure 4C:
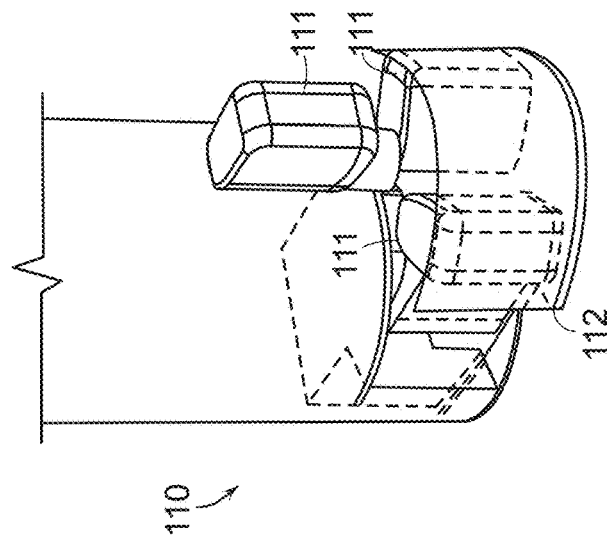
FIG. 4C is a side perspective view of the carriage assembly of FIG. 4A with an additive container about to be inserted into the carriage assembly.

FIG. 4A-4C depict a carriage assembly 110 capable of receiving and seating one or more additive containers, according to an embodiment. The carriage assembly 110 can be located in a housing (e.g., housing 12), and it can take the general form of a sliding drawer 112. The carriage assembly 110 can slide between a closed position, seen in FIG. 4A, and an open position, seen in FIGS. 4B and 4C. One or more additive containers 111 can be placed inside the carriage assembly 110 for use during a beverage dispensing process.

The drawer 112 can be placed upon one or more tracks (not shown) located within the housing, in order to facilitate opening and closing thereof.

The additive containers 111 are depicted as being arranged in a radial formation, however other formations, including linear, stacked, etc., are also possible. In some variations, the carriage assembly 110 can include a handle (not shown) or some means to assist a user in opening and closing the carriage assembly 110.

Figure 5A:
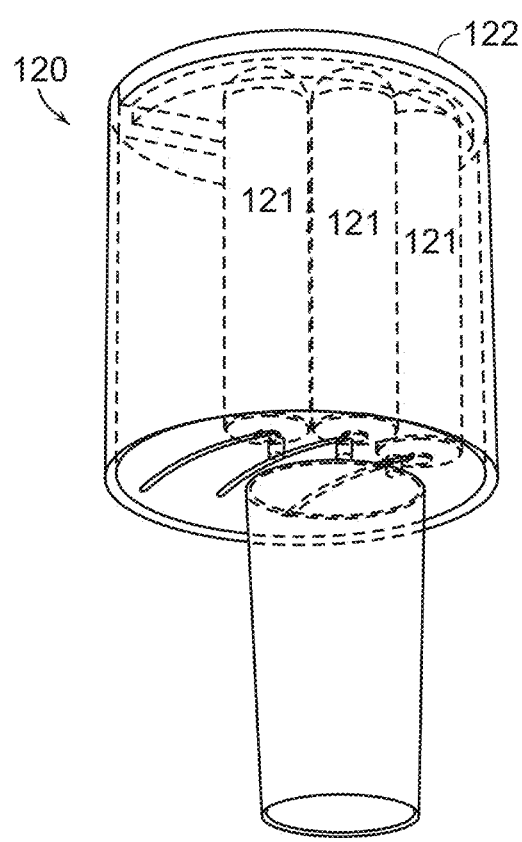
FIG. 5A is a side perspective view of a carriage assembly according to another embodiment.
Figure 5B:
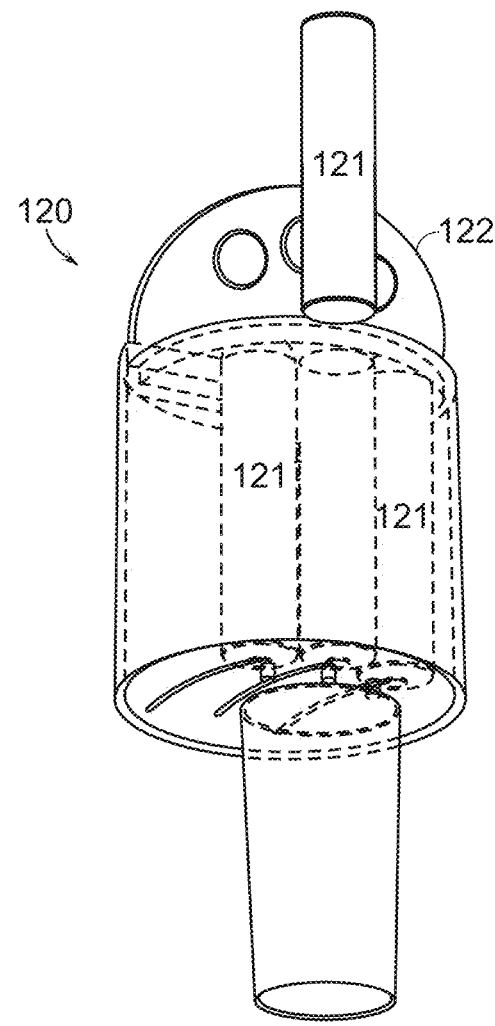
FIG. 5B is a side perspective view of the carriage assembly of FIG. 5A in an open configuration.
Figure 5D:
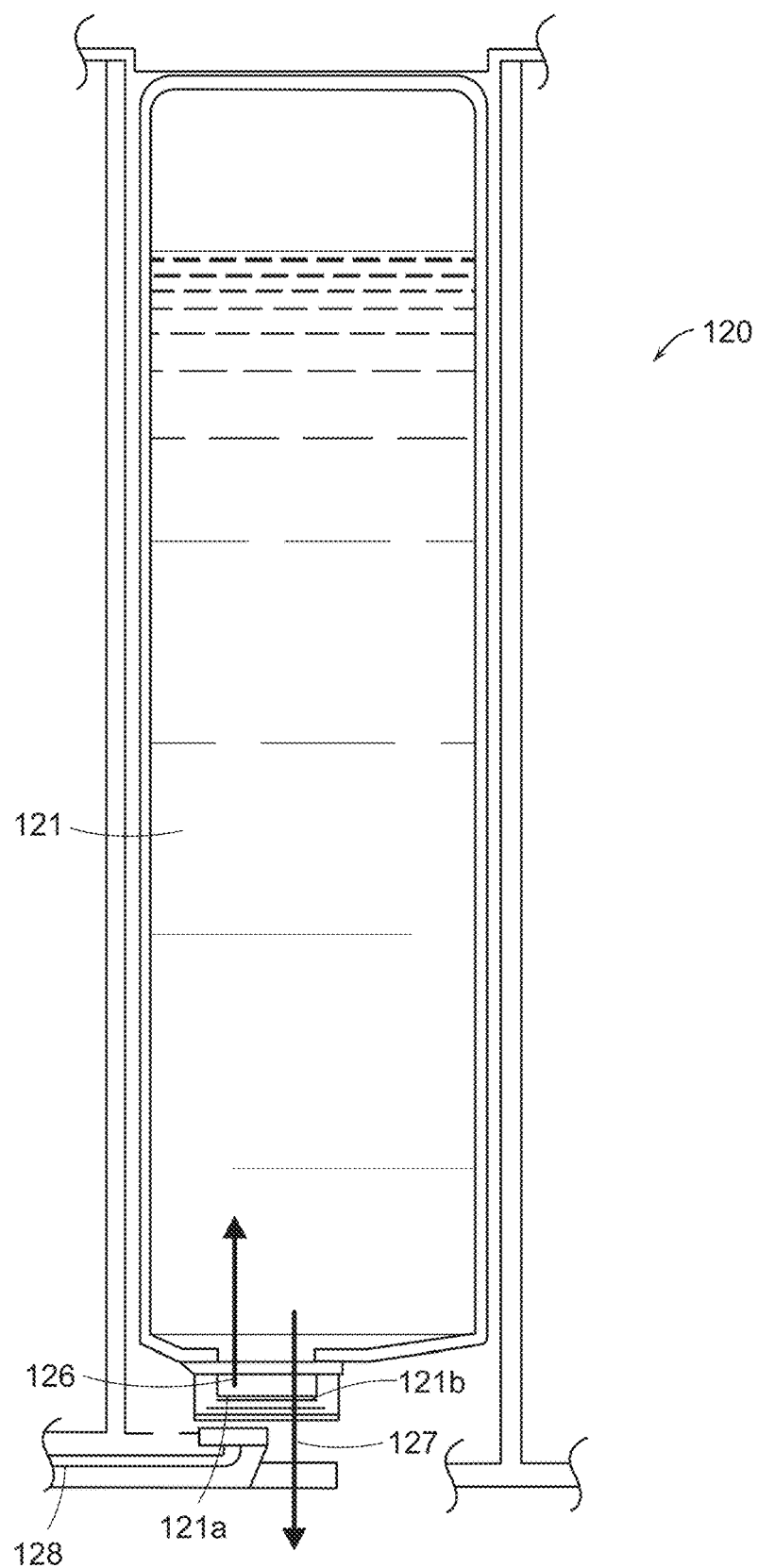
FIG. 5D is a partially-transparent side view of the carriage assembly of FIG. 5A having an additive container contained therein.

FIG. 5A-5D depict a carriage assembly 120 according to an embodiment. The carriage assembly 120 can be a top-loading carriage assembly 120 located in a housing (e.g., housing 12). A lid 122 can be hinged to the housing, which can be opened to load one or more additive containers 121 into the carriage assembly 120, as shown in FIG. 5B. FIG. 5C depicts a close-up view of a plurality of carriages located in the carriage assembly 120, with each having an inlet port 126 and an outlet port 127. Each of the inlet ports 126 has an airline 128 fluidly coupled thereto for introducing gas into a seated additive container (e.g., additive container 121). The airlines 128 can lead to one or more gas sources (not shown). As shown in FIG. 5D, the additive container 121 can have an inlet 121a resting upon an inlet port 124 and an outlet 121b resting upon an outlet port 126. In operation, one or more additive containers 121 can be lowered into the carriage assembly 120. The lid 122 can be closed, which can press the one or more loaded additive containers 121 onto the inlet port 126 and outlet port 127 in order to seal the additive containers 121 thereon. When a beverage dispensing process is initiated that involves dispensing an additive, air can be introduced to the relevant additive container 120 or additive containers 120 to build up internal pressure and force out the additive.

In certain embodiments, the carriage assembly (e.g., carriage assembly 18, 110, 120, etc.) can include one or more viewing windows to allow a user to visually inspect one or more retained additive containers while the additive containers are seated within the carriage assembly. FIGS. 6A-6E depict various embodiments of such viewing windows.

FIGS. 6A and 6B depict a carriage assembly 130 configured to seat and arrange one or more additive containers 131 in a radial formation. The carriage assembly 130 can include one or more viewing windows 132 on an outer portion thereof, which can allow a user to visually inspect each of the one or more seated additive containers 131. The viewing windows 132 can be arranged to align with the radial formation.

FIGS. 6C and 6D depict a carriage assembly 130' configured to seat and arrange one or more additive containers 131' in a linear formation. The carriage assembly 130' can include one or more viewing windows 132' arranged to align with the linear formation of the one or more seated additive containers 131'.

Figure 6E:
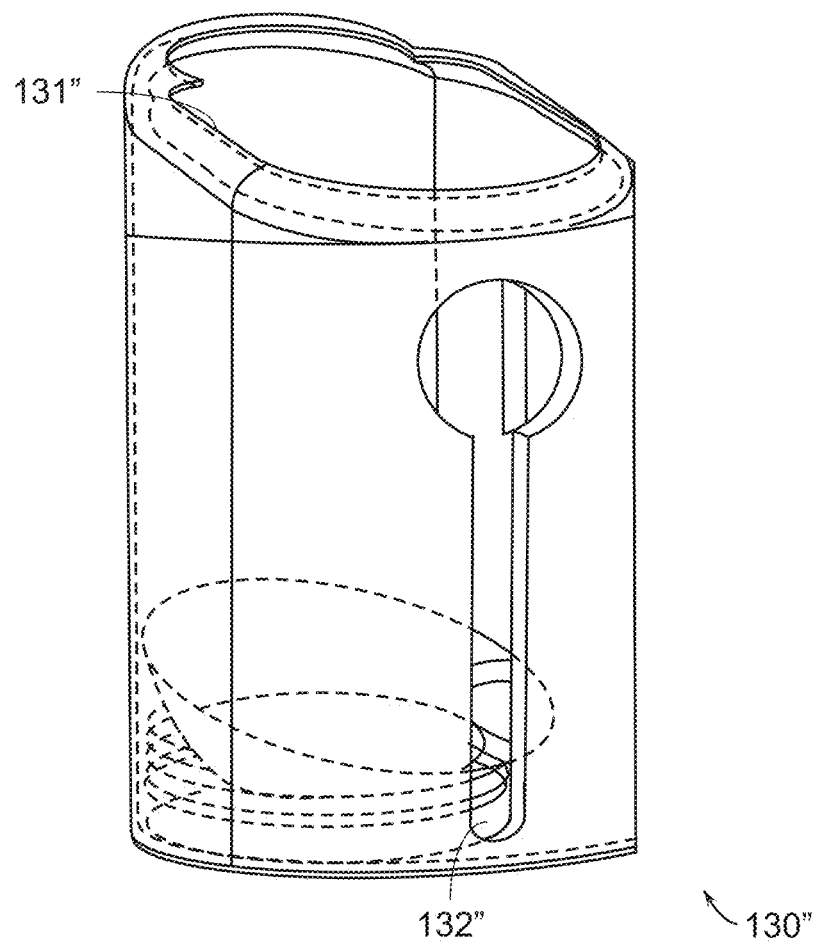
FIG. 6E is a partial perspective front view of a carriage assembly having a thermometer-shaped viewing window according to another embodiment.

FIG. 6E depicts a carriage assembly 130" with a viewing window 131" having a thermometer-type shape. The viewing window 131" can be included on any carriage assembly described herein. Additive containers, for example additive containers 131, 131', 131" and any other additive container, can be made from transparent and/or semi-transparent material, which can allow for a user to more easily see an additive contained therein.

With reference now to FIGS. 7A-15D, illustrated are additive containers and features thereof according to various embodiments.

Figure 7B:
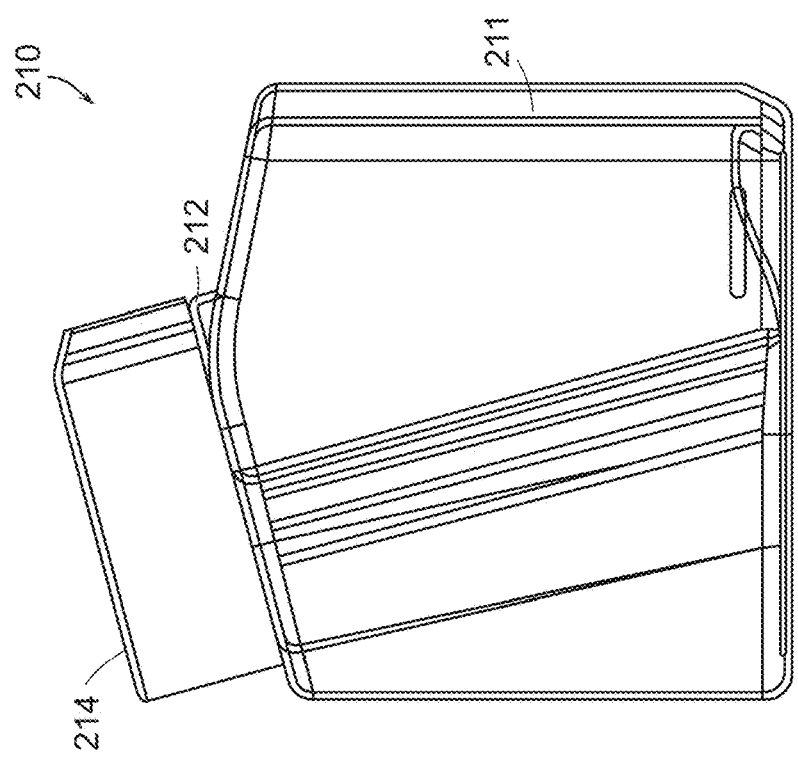
FIG. 7B is a right side view of the additive container of FIG. 7A.
Figure 7A:
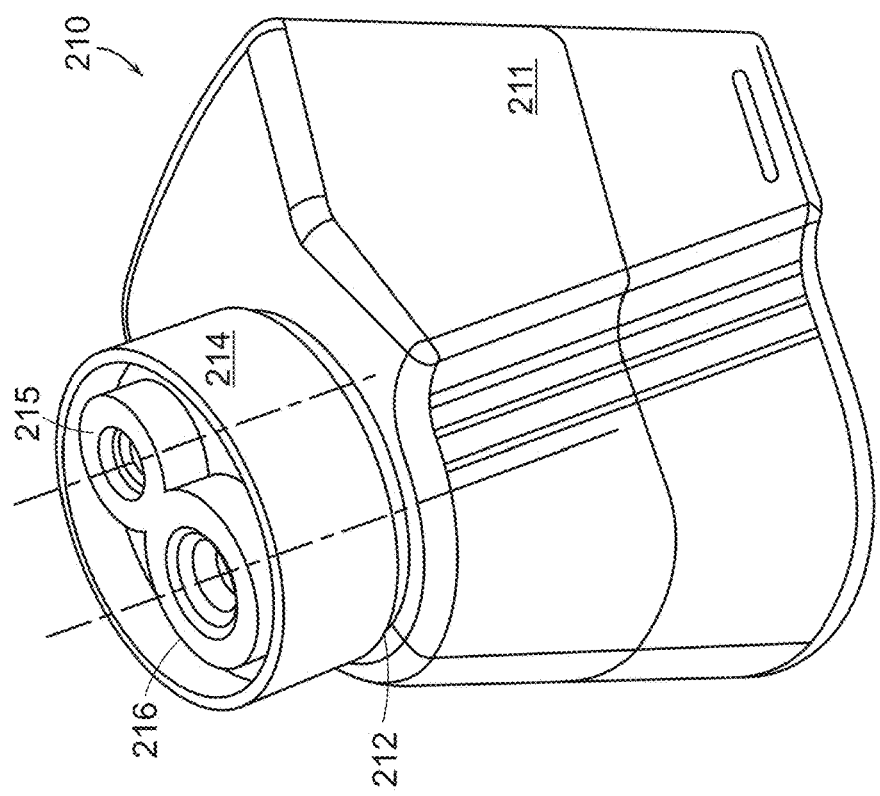
FIG. 7A is a perspective side view of one embodiment of an additive container having an angled neck.

FIGS. 7A-7B depict an embodiment of an additive container 210 having an angled neck 212. The additive container 210 generally includes a container 211 containing an additive (not shown). A lid 214 is disposed on the angled neck 212, and the lid can include an inlet 215 and an outlet 216 thereon. As a result of the angled neck 212, the lid 214, including the inlet 215 and the outlet 216, are angled relative to the container 211 of the additive container 210.

FIGS. 8A-8D depicts an embodiment of an additive container 220 having a built-in piston (also referred to herein as a "plunger"). The additive container 220 can have a cylindrical body 222 defining an interior chamber containing an additive, and can include a plunger 224 disposed therein. The additive container 220 can include a skirt 225 an outlet 226 fluidly coupled to the interior chamber in order to facilitate dispensing the additive. The outlet 226 can be sealed by a removable foil 226a. The plunger 224 can be physically actuated by an element pressing down on the plunger 224 to cause the outlet 226 to emit fluid. In certain embodiments, the additive container 220 can also include an air inlet 227 for receiving air. In such embodiments, the additive container 220 can be seated in a carriage assembly 228 and then air can be introduced through the air inlet 227. The introduced air can case the plunger 224 to be actuated as a result of an increase in pressure within the body 222 received via the air inlet 227. The actuator of the plunger 224 in this manner can cause the outlet 227 to dispense the stored additive.

Figure 8D:
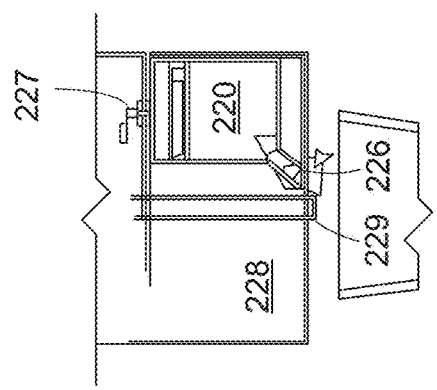
FIG. 8D is a partial cross-sectional side view of a dispensing process of the additive container of FIG. 8A.
Figure 8C:
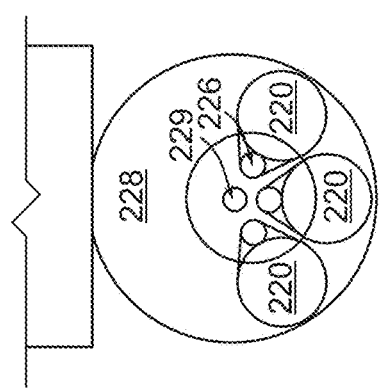
FIG. 8C is a top view of a carriage assembly containing several of the additive container of FIG. 8A.
Figure 8B:
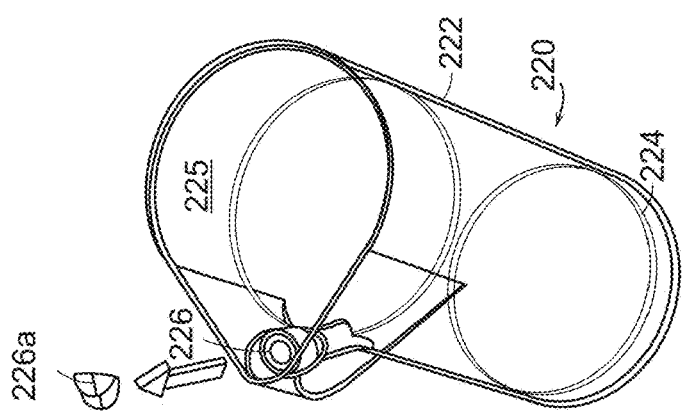
FIG. 8B is a top perspective view of the additive container of FIG. 8A.
Figure 8A:
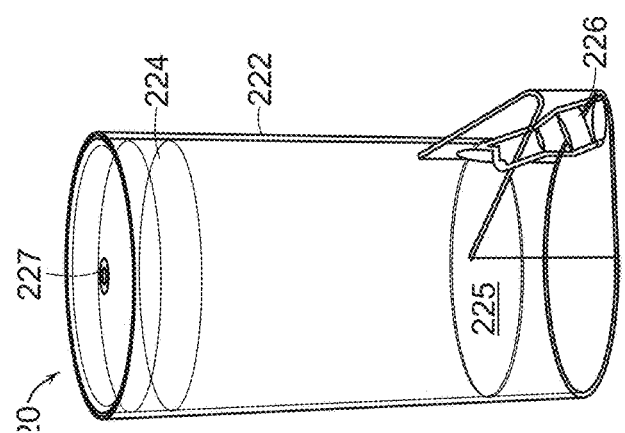
FIG. 8A is side perspective view of an additive container having a piston system.

When one or more additive containers 220 are seated in a carriage assembly 228, they can be arranged in a radial formation such that their respective outlets 226 are arranged close to each other, as seen, for example, in FIG. 8C. A separate outlet 229 can be disposed centrally of the outlets 226 for dispensing still and/or carbonated water.

Figure 9A:
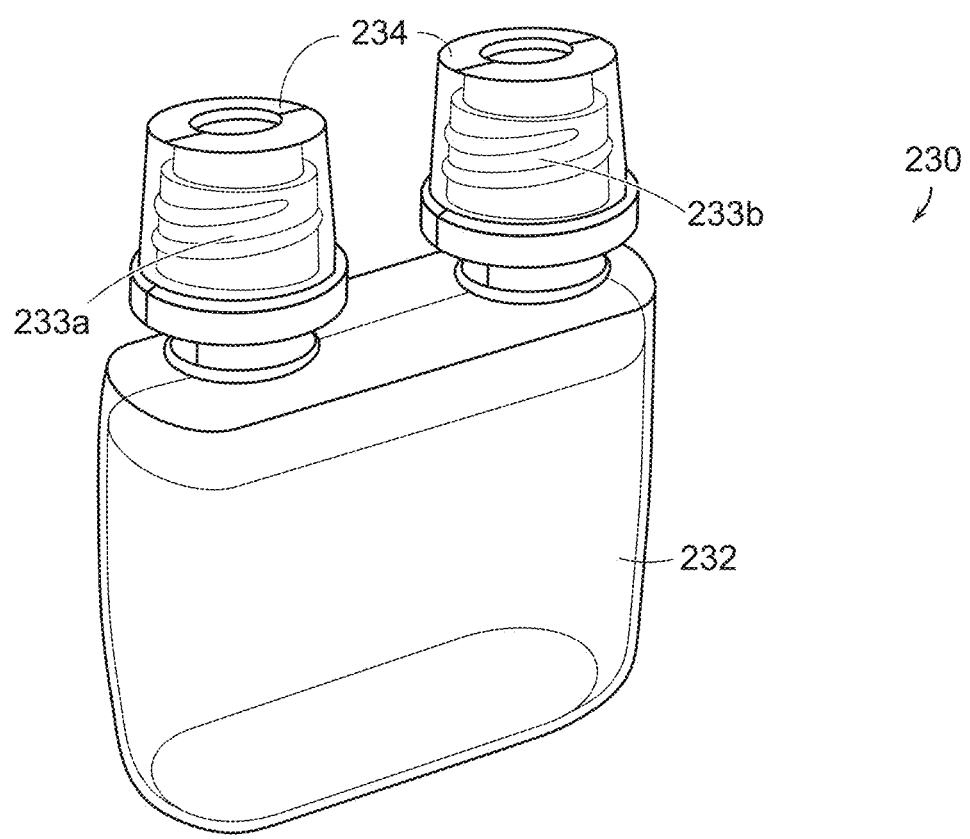
FIG. 9A is a perspective view of an additive container having a container made with a Blow-Fill-Seal process and a lid.
Figure 9D:
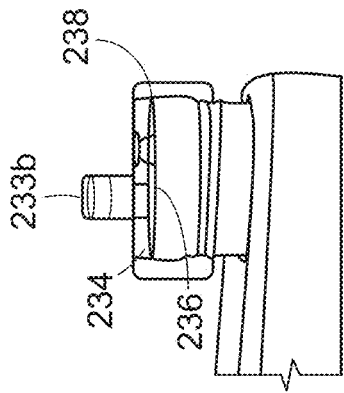
FIG. 9D is a partial side view of the assembly process of FIG. 9B where the lid is snapped into position
Figure 9C:
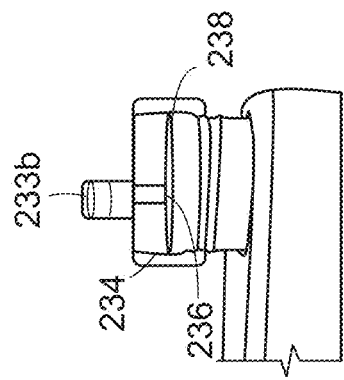
FIG. 9C is a partial side view of the assembly process of FIG. 9B where a piercing element on the lid has pierced a seal on the container.
Figure 9B:
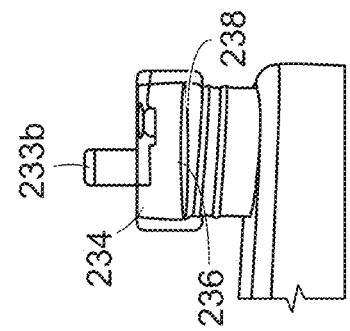
FIG. 9B is a partial side view of an assembly process of the additive container and lid of FIG. 9A.

In certain embodiments, an additive container can be formed using a Blow-Fill-Seal manufacturing process. FIGS. 9A-9D illustrates an embodiment of an additive container 230 manufactured according to such a process. The additive container 230 can include a container 232 and one or more lids 234. The container 232 can be manufactured to include an inlet 233a and an outlet 233b, filled with an additive, and sealed with one or more seals 238 over each of the inlet 233a and the outlet 233b, as shown in FIG. 9B. The lids 234 with a piercing element 236 can be manufactured separately. When a user is ready to use the additive container 230, the user can attach the one or more lids 234 to the container 232 over the inlet 233a and/or the outlet 233b, piercing the seal 238 with the piercing element 236 in the process, as shown in FIG. 9C, and enabling access to the additive stored inside with the lid 234 snapped into a seated position, as shown in FIG. 9D. In certain embodiments, the container 232 can omit an inlet 233a and can only include an outlet 233b. In such embodiments, only one lid 234 can be used.

Figure 10B:
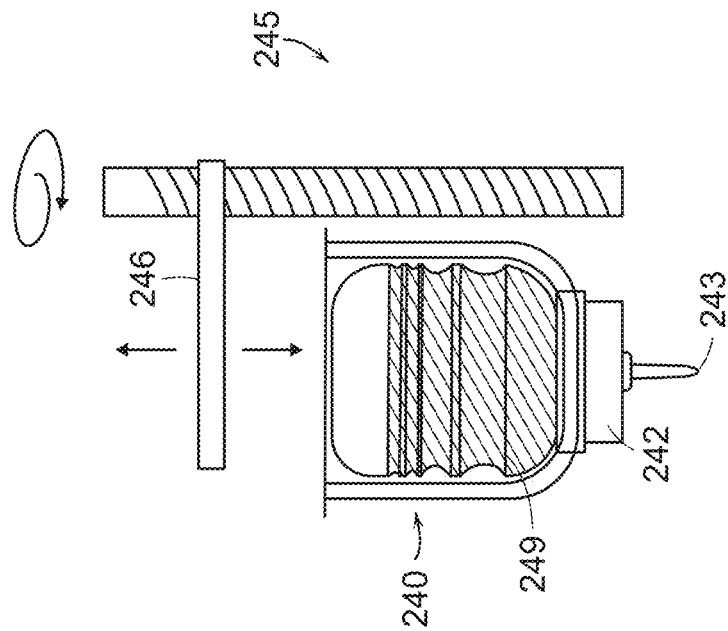
FIG. 10B is a side view of the additive container and actuator of FIG. 10A.
Figure 10A:
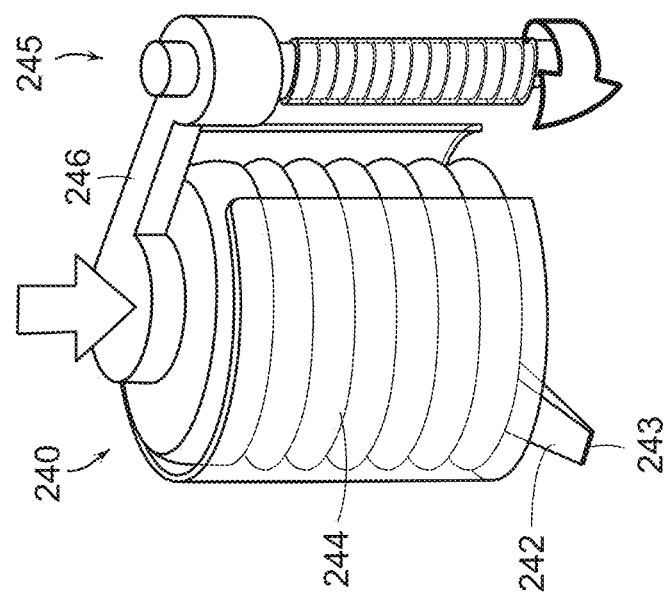
FIG. 10A is a side perspective view of an additive container having a collapsible body coupled to an actuator.

FIGS. 10A-10B illustrates an additive container 240 according to another embodiment. The additive container 240 can include a lid 242 coupled to a container 244 containing an additive. The container 244 can be shaped to include an accordion-like body that, when compressed, causes the additive to be emitted through the lid 242 via an outlet 243. The additive container 240 can be placed in a carriage assembly 245 having a screw-driven armature 246 that can be driven to compress the container 244. A sensor (not shown) can be in mechanical and/or electrical communication with the armature 246 to monitor a height of the armature relative to the container 244, corresponding to a compression level of the container 244. In this way, an alert or message can be sent to a user and/or other individual to provide information related to the fill-level of the additive container 240.

Figure 11B:
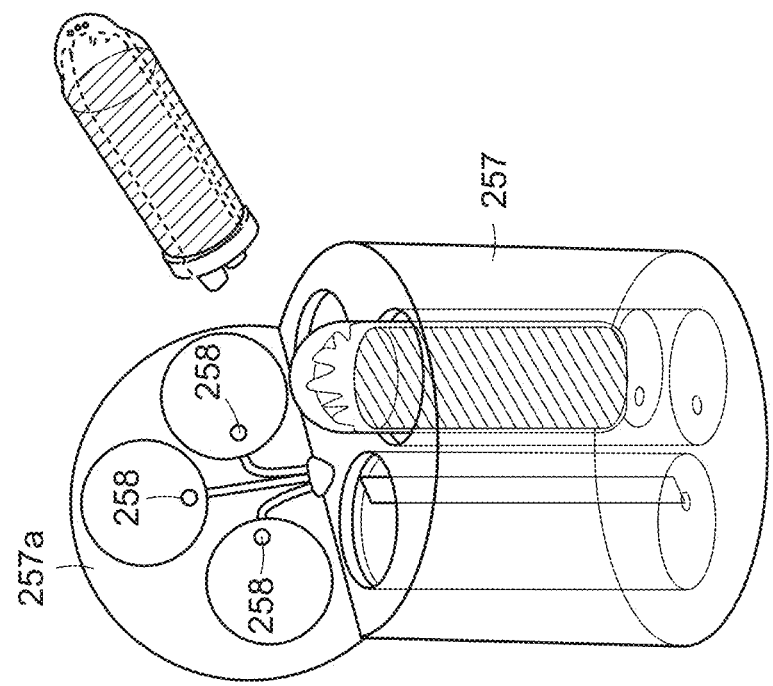
FIG. 11B is a top perspective view of the collapsible additive container of FIG. 11A being loaded into a pressurizable carriage assembly.
Figure 11A:
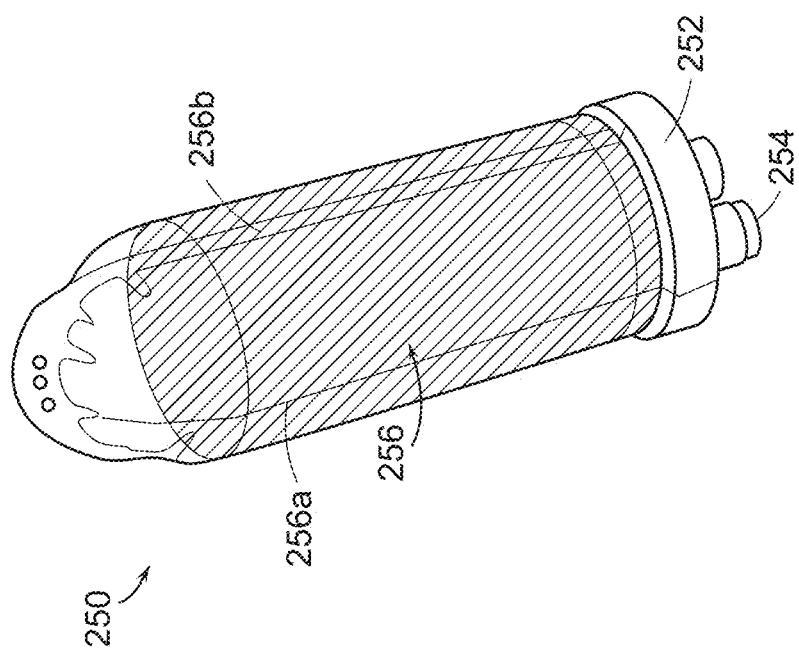
FIG. 11A is a top perspective view of a collapsible additive container according to an embodiment.

FIGS. 11A-11B illustrates an additive container 250 according to another embodiment. The additive container can include a lid 252 having an outlet 254. The lid 252 can be coupled to a pouch 256, which can include a flexible material 256a and can also include a rigid frame 256b. To dispense an additive contained in the pouch 256, the pouch 256 can be compressed in a variety of ways, including by a physical means, such as a piston, a clamp, etc. In certain embodiments, the additive container 250 can be placed inside a pressurizable carriage assembly 257. The outlet 254 can dock in an opening at a lower end of the carriage assembly 257 and can seal off the opening such that the carriage assembly 257 is airtight. A lid 257a can then be closed to seal an upper end of the carriage assembly 257. During operation of a beverage dispensing device, the carriage assembly 257 can be pressurized to a pressure greater than an internal pressure of the pouch 256 by the introduction of air or another gas through an airline 258 or equivalent. This pressure differential can cause the pouch 256 to compress, thereby dispensing the additive as desired.

FIGS. 12A-12B illustrates an additive container 260 according to another embodiment. The additive container can include a container 262 having an outer shell 262a and an inner pouch or bag 262b. A lid 264 with a releasable valve 266 can be coupled to an outlet 268 of the bag 262b. The additive container 260 can be manufactured and filled in such a way that the space between the outer shell 262a and the bag 262b is at an elevated but contained pressure. The bag 262b can be filled with an additive and can have an internal pressure that is less than the pressure between the outer shell 262a and the bag 262b. In order to dispense the additive, the releasable valve 266 can be actuated, and the pressure differential within the additive container can force the additive out of the outlet 268 as desired.

FIGS. 12C-12G illustrate an illustrative process for manufacturing the additive container 260 of FIGS. 12A-12B. The bag 262b can be inserted into the outer shell 262a, and the outer shell 262a can then be pressurized before being sealed off by the lid 264. The bag 262b can then be filled with an additive to cause the bag 262b to inflate within the pressurized outer shell 262a, thereby increasing an internal pressure of the shell 262a interior even further. From there, the additive can be sealed until use.

Figure 13C:
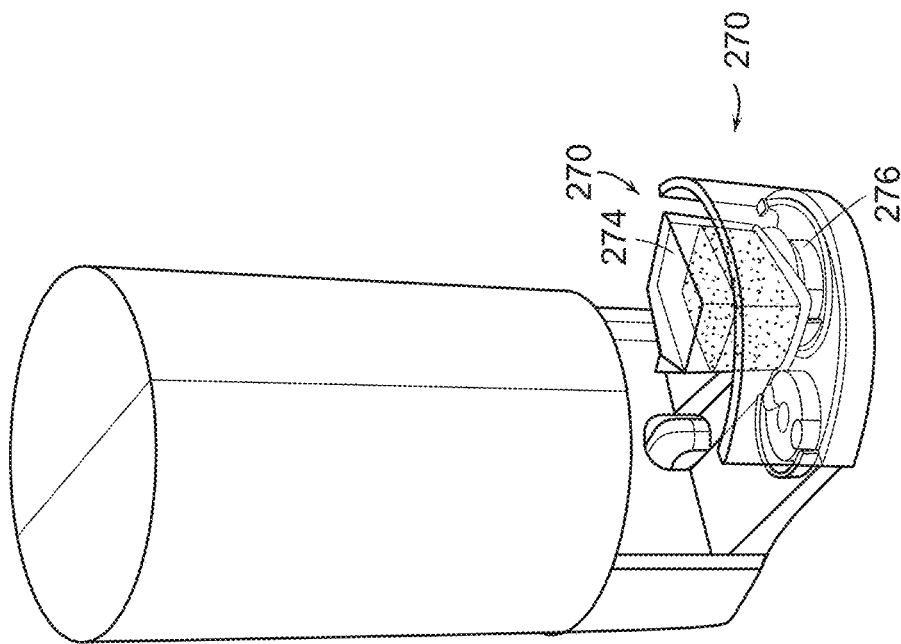
FIG. 13C is a side perspective view of the additive container of FIG. 13A loaded into a carriage assembly having a peristaltic pump feature according to another embodiment.
Figure 13B:
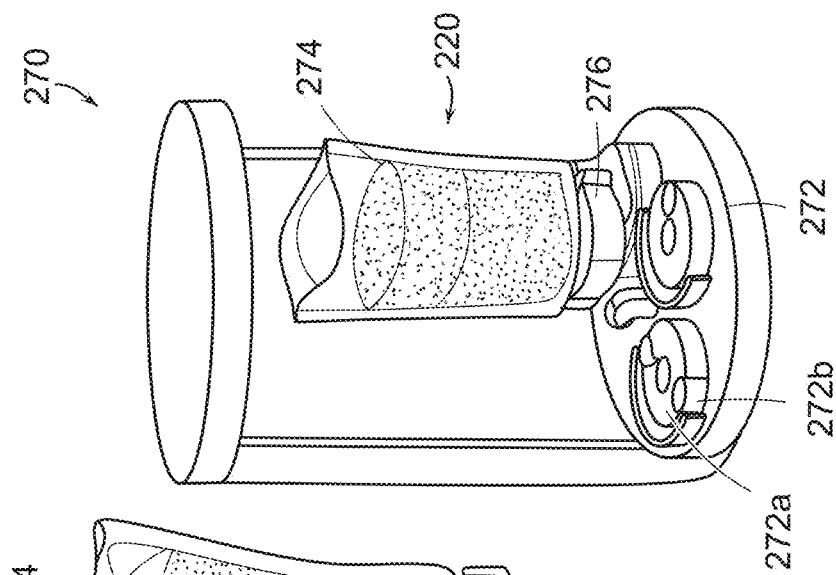
FIG. 13B is a side perspective view of the additive container of FIG. 13A loaded into a carriage assembly having a peristaltic pump feature according to an embodiment.
Figure 13A:
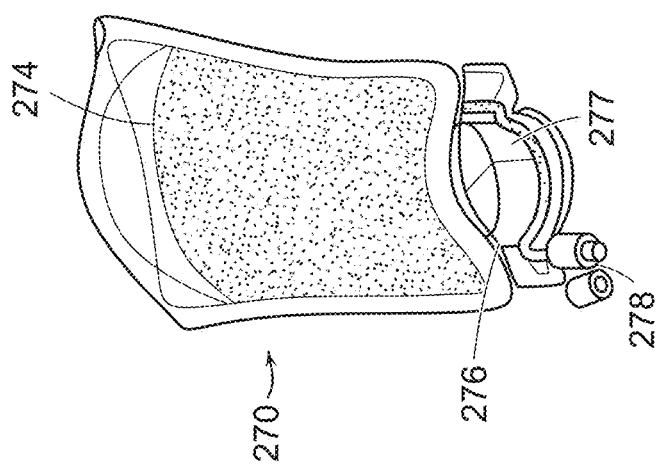
FIG. 13A is a side perspective view of an additive container compatible with a peristaltic pump feature according to another embodiment.

FIGS. 13A-13C illustrates an additive container 270 according to another embodiment that is configured to be usable with a peristaltic pump 272. The additive container 270 can include a flexible pouch 274 with a lid 276 coupled thereto. Leading away from the pouch 274 and extending around a perimeter of the lid 276 can be a hose 277 that terminates in an outlet 278. The additive container 270 can be placed within a carriage assembly 271 that includes a peristaltic pump 272. The peristaltic pump 272, as will be appreciated by a person skilled in the art, can include a rotor 272a with at least one roller 272b coupled thereto. When the additive container 270 is used to dispense the additive, the rotor 272a can rotate, causing the at least one roller 272b to roll along the hose 277, drawing the additive out of the pouch 274 as required for the desired beverage. The carriage assembly 271 can be equipped to receive one or more additive containers 270 that are independently operable to pump stored additives therefrom.

Figure 14B:
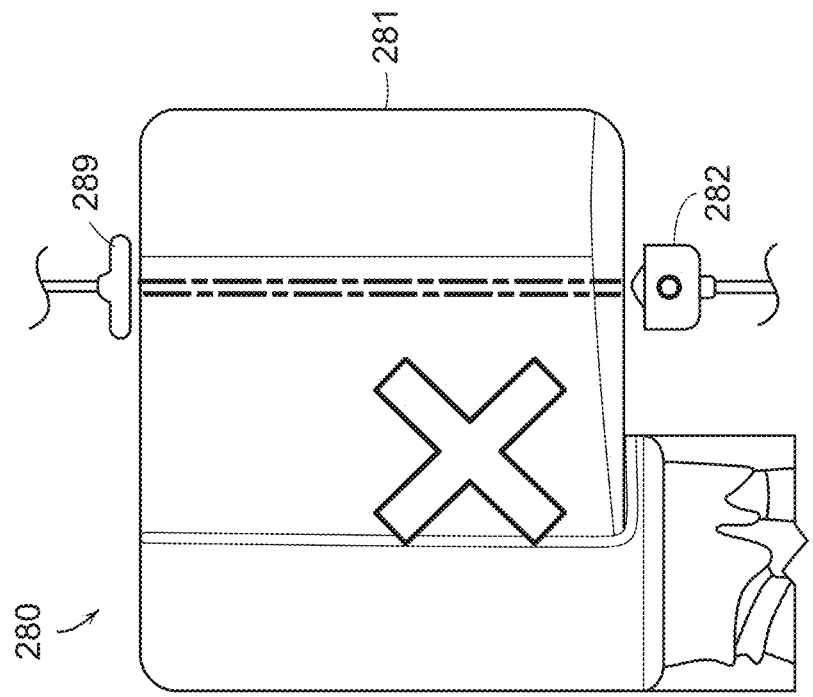
FIG. 14B is a side view of the additive container of FIG. 14A where the infrared level detector detects a low additive volume.
Figure 14A:
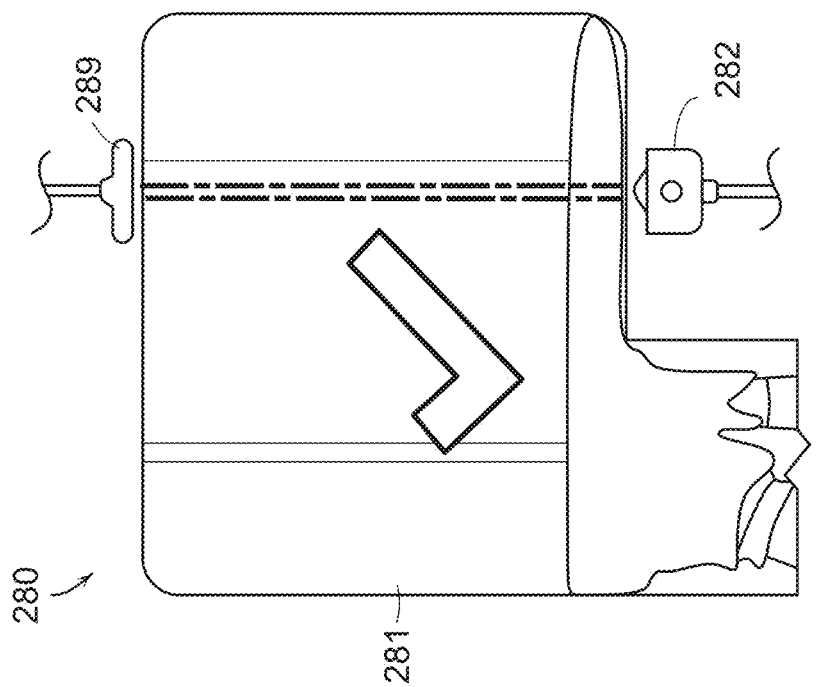
FIG. 14A is a side view of an additive container having an additive detected via an infrared level detector.

In certain embodiments, an additive container, such as those described herein, can include a level indicator having various forms. For example, FIGS. 14A-14B depict an additive container 280 that is configured to interface with an infrared sensor 282 capable of discerning an amount of additive remaining in the additive container 280. The additive container 280 can include a container 281 made of a material that is substantially non-absorbent of infrared radiation, and the additive container 280 can contain an additive that at least partially absorbs and/or scatters infrared radiation. An infrared emitter 284 (e.g., an infrared lamp, a laser diode, filtered light, etc.) can be located within a carriage assembly and aimed at the infrared sensor 282. When the additive container 280 is seated in the carriage assembly, the infrared sensor 282 can be prevented from receiving a signal emitted by the infrared emitter 284 while the additive container 280 still contains a certain amount of additive. As additive is dispensed from the additive container 280, the additive can scatter less and less infrared radiation until, at a certain volume, the infrared sensor 282 is capable of detecting the infrared radiation emitted by the infrared emitter 284. A beverage dispensing device employing the infrared sensor 282 can, depending on the strength of the received infrared signal, output a message (e.g., visible, audible, etc.) to a user informing them of an additive volume in the additive container 280. For example, if the signal is able to pass through a seated additive container 280, the message can inform the user that the additive volume is low.

Figure 14C:
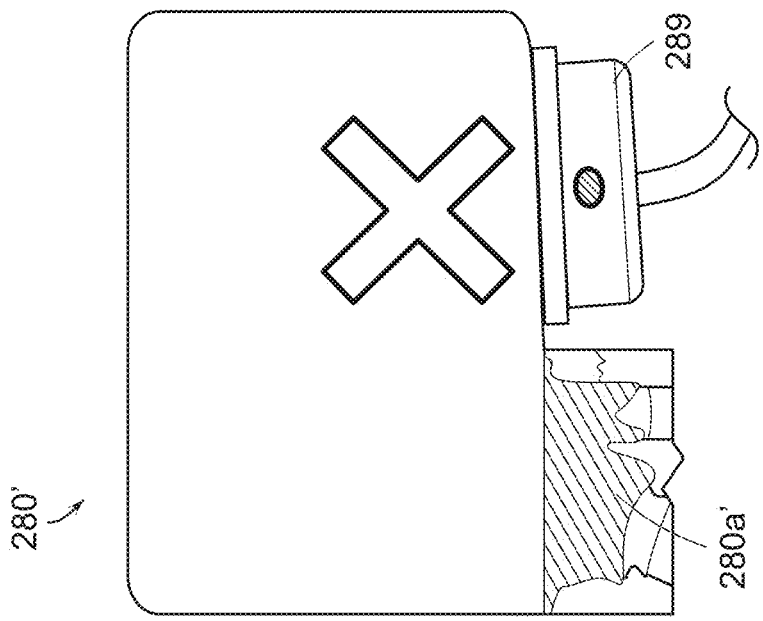
FIG. 14C is a side view of an additive container having an additive detected via a non-contact liquid level indicator according to an embodiment.
Figure 14D:
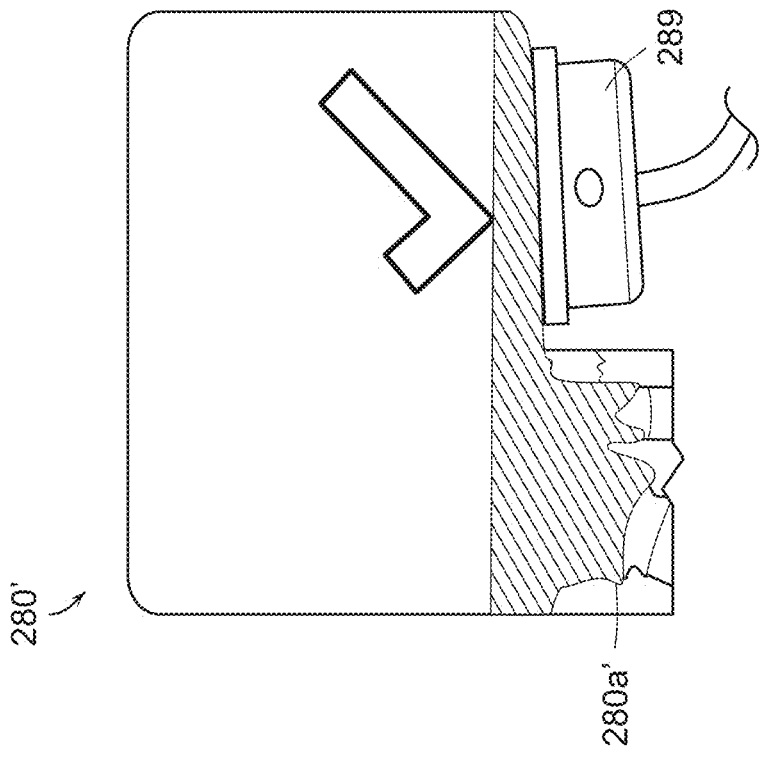
FIG. 14D is a side view of the additive container of FIG. 14C where the non-contact liquid level indicator detects a low additive volume.

In certain embodiments, the level indicator can be in the form of a non-contact liquid level indicator 289, seen, for example, in FIGS. 14C-14D. The non-contact level indicator 289 can be positioned in a carriage assembly, such that when an additive container 280' is retained therein, the non-contact level indicator contacts the additive container 280'. The non-contact level indicator can be capable of detecting an additive located inside the additive container 280', and the non-contact level indicator 289 can be positioned relative to the additive container 280' in such a way that the non-contact level indicator can detect when the additive has reached a low volume. For example, in embodiments where the additive container 280' includes a neck 280a', the non-contact level indicator 289 can be positioned on the additive container 280' such that when the additive reaches a low volume, the additive may only pool in the neck 280a' away from the non-contact level indicator 289, as seen in FIG. 14D.

Certain illustrative implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting illustrative implementations and that the scope of the present invention is defined solely by the claims. The features illustrated or described in connection with one illustrative implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A dispensing system, comprising:
   a housing;
   a carbonation assembly disposed within the housing and configured to selectively carbonate a fluid to form a carbonated fluid; and
   a drawer movably mounted to the housing and configured to seat a plurality of additive containers, the drawer having a bottom surface including a plurality of inlet ports and a plurality of outlet ports configured to respectively couple to the plurality of seated additive containers;
   wherein the dispensing system is configured to selectively introduce at least one gas into each of the plurality of additive containers to dispense an additive contained within each seated additive container received in the drawer from a respective outlet port in the plurality of outlet ports, and is configured to dispense the carbonated fluid from a fluid port separate from the plurality of outlet ports.

2. The dispensing system of claim 1, wherein the drawer is movable horizontally between an open position in which the plurality of additive containers can be top-loaded into the drawer, and a closed position in which the drawer is fully disposed within the housing.

3. The dispensing system of claim 1, wherein the drawer is configured to seat the plurality of additive containers in one of a radial formation and a linear formation.

4. The dispensing system of claim 1, wherein the fluid port is centrally disposed, and wherein the drawer is configured to seat the plurality of additive containers peripherally of the fluid port.

5. The dispensing system of claim 1, wherein the plurality of inlet ports are fluidly coupled to an air pump, the air pump being configured to selectively introduce the at least one gas into the plurality of additive containers seated in the drawer.

6. The dispensing system of claim 1, wherein the drawer includes at least one viewing window configured to enable viewing of the seated plurality of additive containers in the drawer when the drawer is in a closed position.

7. A dispensing system, comprising:
   a housing;
   a carbonation assembly at least partially contained within the housing and configured to selectively carbonate a fluid;
   a top-loading carriage assembly coupled to the housing and having a plurality of isolated silos, each silo configured to receive an additive container; and
   wherein the dispensing system is configured to dispense an additive disposed within the received additive container disposed in each silo of the carriage assembly and to dispense a fluid that is selectively carbonated by the carbonation assembly into a receptacle, and wherein the top-loading carriage assembly includes an inlet port fluidly coupled to at least one air pump and configured to selectively introduce at least one gas into the received additive container in each silo to cause the received additive container in each silo to dispense an additive.

8. The dispensing system of claim 7, wherein the top-loading carriage assembly includes a lid movable between an open position and a closed position, and wherein the lid, in the closed position, is configured to apply a force to the received additive container in each silo to couple an inlet port in the additive container with an outlet port in the housing.

9. The dispensing system of claim 7, wherein each of the isolated silos includes an inlet port and an outlet port, and wherein each inlet port is configured to allow at least one gas to be introduced into the received additive container in each silo to cause the received additive container in each silo to dispense an additive from the respective outlet port.

10. The dispensing system of claim 7, wherein each of the isolated silos are independently pressurizable to cause the received additive container therein to compress and dispense an additive.

* * * * *